(12) United States Patent
Gugliotti et al.

(10) Patent No.: US 6,267,625 B1
(45) Date of Patent: Jul. 31, 2001

(54) HIGH DENSITY ELECTRICAL INTERCONNECT SYSTEM HAVING ENHANCED GROUNDING AND CROSS-TALK REDUCTION CAPABILITY

(75) Inventors: Carmine Gugliotti, Waterbury; Robert M. Bradley, Oakville, both of CT (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/640,182

(22) Filed: Aug. 17, 2000

Related U.S. Application Data

(63) Continuation-in-part of application No. 09/295,344, filed on Apr. 21, 1999, now Pat. No. 6,179,663.
(60) Provisional application No. 60/149,178, filed on Aug. 17, 1999.

(51) Int. Cl.[7] ............................................. H01R 13/648
(52) U.S. Cl. ................................. 439/608; 439/931
(58) Field of Search ................................. 439/608, 660, 439/686, 689, 931

(56) References Cited

U.S. PATENT DOCUMENTS

| Re. 35,896 | 9/1998 | Brunker et al. . |
|---|---|---|
| 3,643,201 | 2/1972 | Harwood . |
| 5,169,324 | 12/1992 | Lemke et al. . |
| 5,349,137 | 9/1994 | Cedrone . |
| 5,417,578 | 5/1995 | Mroczkowski et al. . |
| 5,575,688 | 11/1996 | Crane, Jr. . |
| 5,618,191 | 4/1997 | Chikano et al. . |
| 5,634,821 | 6/1997 | Crane, Jr. . |
| 5,637,019 | 6/1997 | Crane, Jr. et al. . |
| 5,993,259 | 11/1999 | Stokoe et al. . |

FOREIGN PATENT DOCUMENTS

| 3914978A1 | 5/1989 | (DE) . |
|---|---|---|
| 0726477A2 | 1/1996 | (EP) . |
| 0852414A2 | 12/1997 | (EP) . |
| WO99/56352 | 4/1999 | (WO) . |

Primary Examiner—Khiem Nguyen
(74) Attorney, Agent, or Firm—Lowe Hauptman Gilman & Berner, LLP

(57) ABSTRACT

The present invention provides an electrical interconnect system using multiple grounding methods to reduce or prevent spurious signals from interfering with high density contacts carrying high speed transmissions. A first connector includes an insulative pillar partially surrounded by a plurality of signal contacts. A central ground contact is at least partially located within the insulative pillar. A second connector includes a plurality of flexible signal contacts for mating with the signal contacts adjacent the insulative pillar. Additionally, flexible ground contacts in the first connector are in contact with an electrically conductive shield. The second connector also includes a central ground contact for receiving the central ground contact of the first connector. The ground contacts provide a first method of providing a ground path to reduce spurious signals from entering the signal path. The electrically conducting shield is located outside the signal contacts when the first and the second connectors are mated. The electrically conducting shield is a conductive path to ground. The electrically conductive shield has a plurality of openings through which the signal contacts and the insulative pillar extend when the first connector and the second connector are in a mated condition. The first connector includes a member which provides a ground path between the first connector and the electrically conducting shield. Advantageously, the electrical interconnect system can use multiple grounding methods which are particularly important in a high density electrical interconnect system where the contacts are closely spaced and susceptible to noise and other spurious signals.

22 Claims, 24 Drawing Sheets

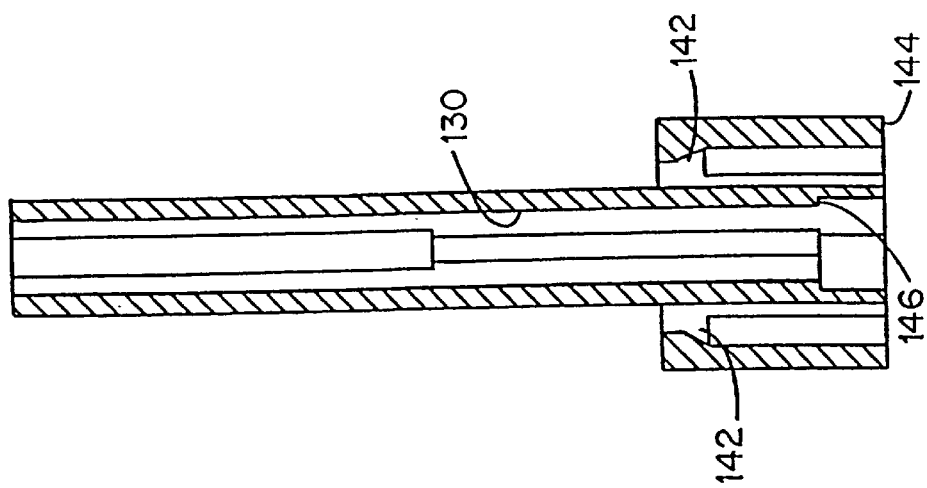
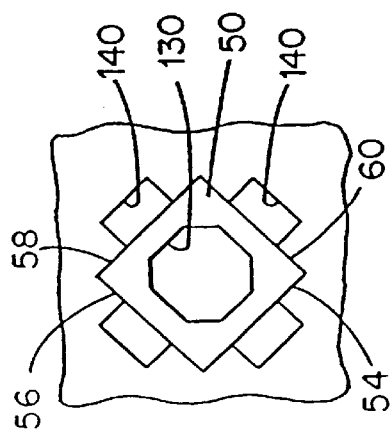
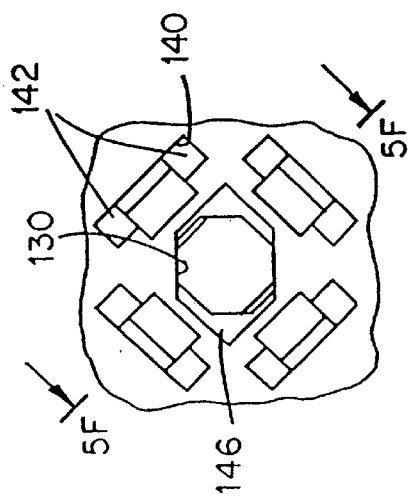

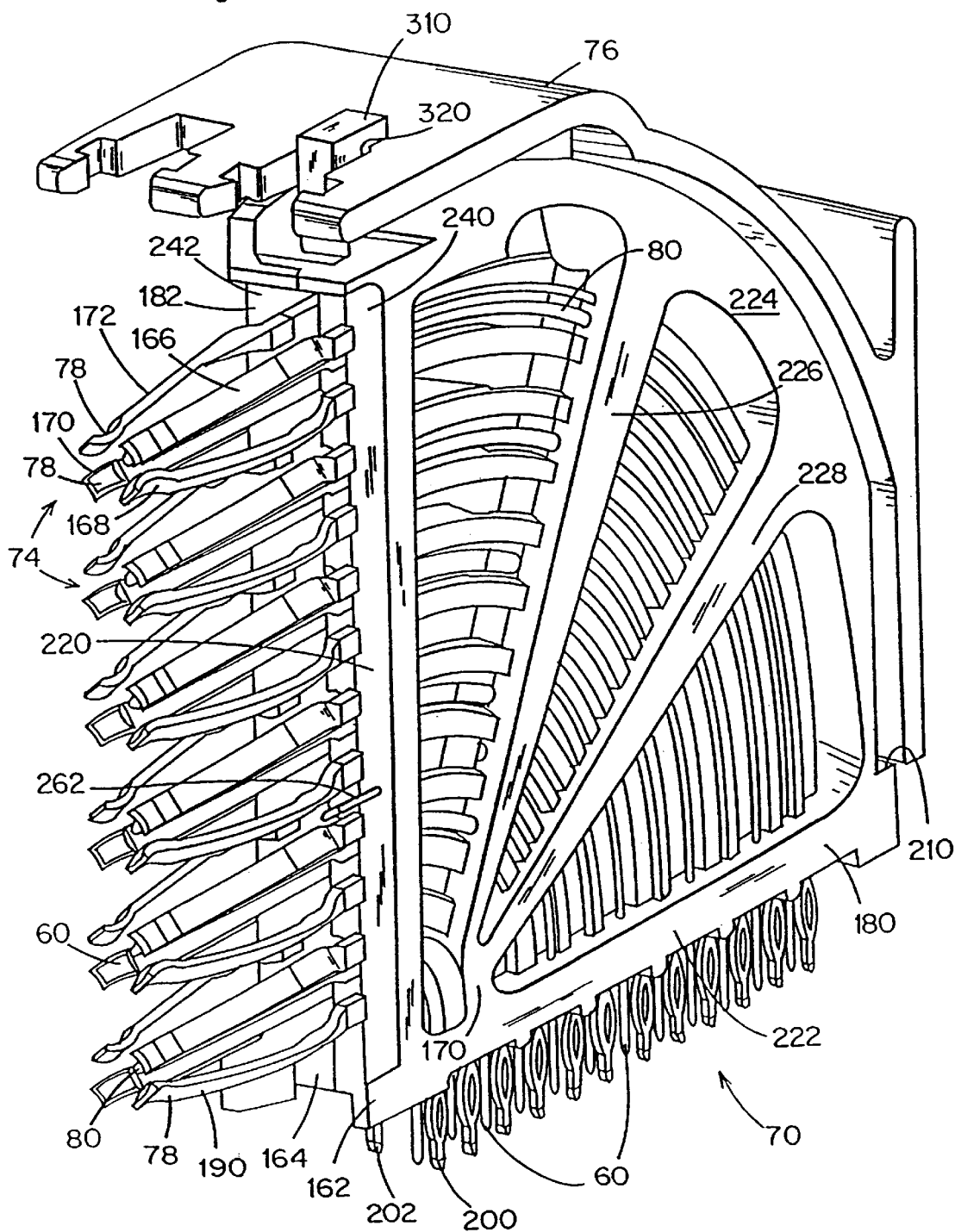

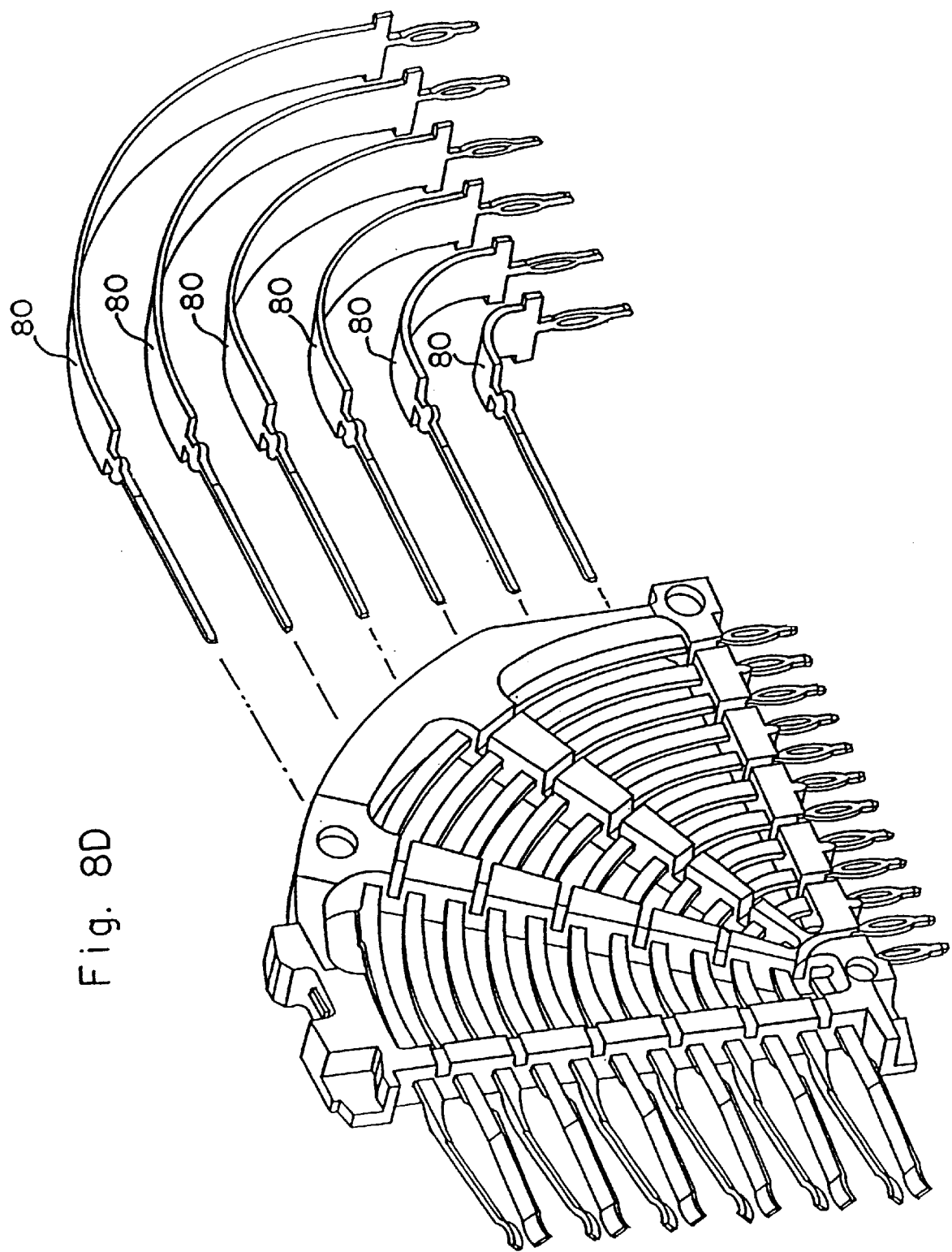

HIGH DENSITY ELECTRICAL INTERCONNECT SYSTEM HAVING ENHANCED GROUNDING AND CROSS-TALK REDUCTION CAPABILITY

RELATED APPLICATIONS

The present application claims priority of U.S. Provisional Application Serial No. 60/149,178 filed Aug. 17, 1999, entitled "HIGH DENSITY ELECTRICAL INTERCONNECT SYSTEM HAVING ENHANCED GROUNDING AND CROSS-TALK REDUCTION CAPABILITY", and U.S. patent application Ser. No. 09/295,344 filed Apr. 21, 1999, now U.S. Pat. No. 6,179,663, issued on Jan. 30, 2001, of which this application is a continuation-in-part application, entitled "HIGH DENSITY ELECTRICAL INTERCONNECT SYSTEM HAVING ENHANCED GROUNDING AND CROSS-TALK REDUCTION CAPABILITY, the disclosures of which are incorporated by reference herein in their entirety.

FIELD OF THE INVENTION

The present invention relates generally to an electrical interconnection system for connecting daughter cards to an electrical backpanel, and more particularly to a high density electrical connector for connecting daughter cards to an electrical backpanel. The present invention is even more specifically directed to an electrical interconnect having an electrically conductive closed-entry cover plate which is in contact with one or more contacts to provide a conductive path to ground. The daughter card side of the connector and backpanel side of the interconnection system each use multiple grounding methods to ensure enhanced grounding of the respective sides of the connector to ground planes on the backpanel and daughter card, respectively. The signal carrying contacts on the daughter card and backpanel sides of the connector each have a mating grounding post to ensure reduced cross-talk between signals transmitted through adjacent contacts.

BACKGROUND OF THE INVENTION

Electrical interconnect systems (including electronic interconnect systems) are used for interconnecting electrical and electronic systems and components. In general, electrical interconnect systems include both a projection-type interconnect component, such as a conductive pin, and a receiving-type interconnect component, such as a conductive socket. In these types of electrical interconnect systems, electrical interconnection is accomplished by inserting the projection-type interconnect component into the receiving-type interconnect component. Such insertion brings the conductive portions of the projection-type and receiving-type interconnect components into contact with each other so that electrical signals may be transmitted through the interconnect components. In a typical interconnect system, a plurality of individual conductive pins are positioned in a grid formation and a plurality of individual conductive sockets are arranged to receive the individual pins, with each pin and socket pair transmitting a different electrical signal.

Computer and telecommunication applications frequently require high density interconnect systems for transferring signals between backplanes and attached devices, for example daughter cards. The high speed signals that are transferred through such interconnects are susceptible to cross-talk due to the signal speeds and proximate locations of the signal carrying conductors adjacent to each other.

High-density electrical interconnect systems are characterized by the inclusion of a large number of interconnect component contacts within a small area. By definition, high-density electrical interconnect systems have a greater number of connections in the same space required by lower-density interconnect systems. The short signal paths associated with high-density interconnect systems allows such systems to transmit electrical signals at higher speeds. Because modern telecommunication equipment and computers require higher circuit densities, there is a need for interconnect systems to connect such higher density circuits while avoiding introducing cross-talk due to the density of the signal paths carried by such interconnect systems.

Several high-density electrical interconnect systems have been proposed such as those disclosed in U.S. Pat. Nos. 5,575,688 and 5,634,821. The major drawback of such systems is that the high density has the significant drawback of inducing cross talk between signal contacts because the signal contacts are closely spaced. Cross talk is undesired signals in an electrical circuit as a result of coupling between transmission circuits. Thus, there is a need in the art for a high density electrical interconnect system that reduces or eliminates cross talk between closely spaced electrical signal contacts.

SUMMARY OF THE INVENTION

It is, therefore, an object of the present invention to provide a high density electrical interconnect system that reduces or eliminates at the desired transmission speed cross talk between closely spaced electrical signal contacts.

It is another object of the present invention to provide a high density electrical interconnect system that is cost effective to manufacture and reliable in operation.

It is yet another object of the present invention to provide a high density electrical interconnect system that uses multiple grounding methods.

Another object of the present invention is to provide an electrical interconnect having an electrically conductive closed-entry cover plate which is in contact with one or more contacts to provide a conductive path to ground.

It is a further object of the present to provide a high density electrical interconnect system that has a central ground contact.

It is yet a further object of the present invention to provide a high density connector capable of being press-fit into a circuit board.

The present invention provides an electrical interconnect system using multiple grounding methods to reduce or prevent spurious signals from interfering with high density contacts carrying high speed transmissions. A first connector includes an insulative pillar partially surrounded by a plurality of signal contacts. A ground contact is at least partially located within the insulative pillar. A second connector includes a plurality of flexible signal contacts for mating with the signal contacts adjacent the insulative pillar. Additionally, flexible ground contacts in the first connector are in contact with an electrically conductive shield. The second connector also includes a ground contact for receiving the ground contact of the first connector. The ground contacts provide a first method of providing a ground path to reduce spurious signals from entering the signal path. The electrically conducting shield is located outside the signal contacts when the first and the second connectors are mated. The electrically conducting shield is a conductive path to ground. The electrically conductive shield has a plurality of openings through which the signal contacts and the insulative pillar extend when the first connector and the second connector are in a mated condition. The first connector includes a member which provides a ground path between the first connector and the electrically conducting shield. Advantageously, the electrical interconnect system can use multiple grounding methods which are particularly important in a high density electrical interconnect system where the contacts are closely spaced and susceptible to noise and other spurious signals.

These and other objects of the present invention are achieved by an electrical interconnect system including a first electrical connector having a plurality of spaced apart sets of electrically conductive contacts. Each contact set has multiple signal contacts spaced outwardly from a central ground contact. Each of the ground contacts has an end for contact with a ground plane in a first printed circuit board and a connector end. Each of the signal contacts has a card end for contact with a signal path in the first printed board and a connector end. The first electrical connector has a plurality of flexible ground contacts for contact with a ground plane in the first printed circuit board. A second electrical connector has a plurality of spaced apart sets of electrically conductive contacts with each contact set having multiple signal contacts spaced outwardly from a central ground contact. An insulator substantially surrounds a central ground contact and multiple signal contacts are spaced outwardly from the insulator. Each of the ground contacts has an end for contact with a ground plane in a second printed circuit board and a connector end. Each of the signal contacts has an end for contact with a signal path in the second printed circuit board and a connector end. A closed entry plate is positioned in the first electrical connector. The plate has a plurality of openings. When a set of contacts of the first electrical connector extends through a corresponding one of the plurality of openings, the flexible contacts are in contact with the closed entry plate. When the first electrical connector is mated with the second electrical connector, the ground contacts in the second electrical connector and the first electrical connector are in contact and the signal contacts in the first electrical connector and the second electrical connector are in contact.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 5D is an enlarged view of a portion of the backpanel connector of FIG. 5A;

FIG. 5E is an enlarged view of a portion of the backpanel connector of FIG. 5B;

FIG. 5F is a cross-sectional view taken along lines 5F—5F in FIG. 5E;

FIG. 6A is a perspective view of a wafer assembly retained in a stiffener according to the present invention;

FIG. 8D is an exploded partial perspective view of the left wafer assembly and the center ground contact post;

BEST MODE FOR CARRYING OUT THE INVENTION

Figure 1A:
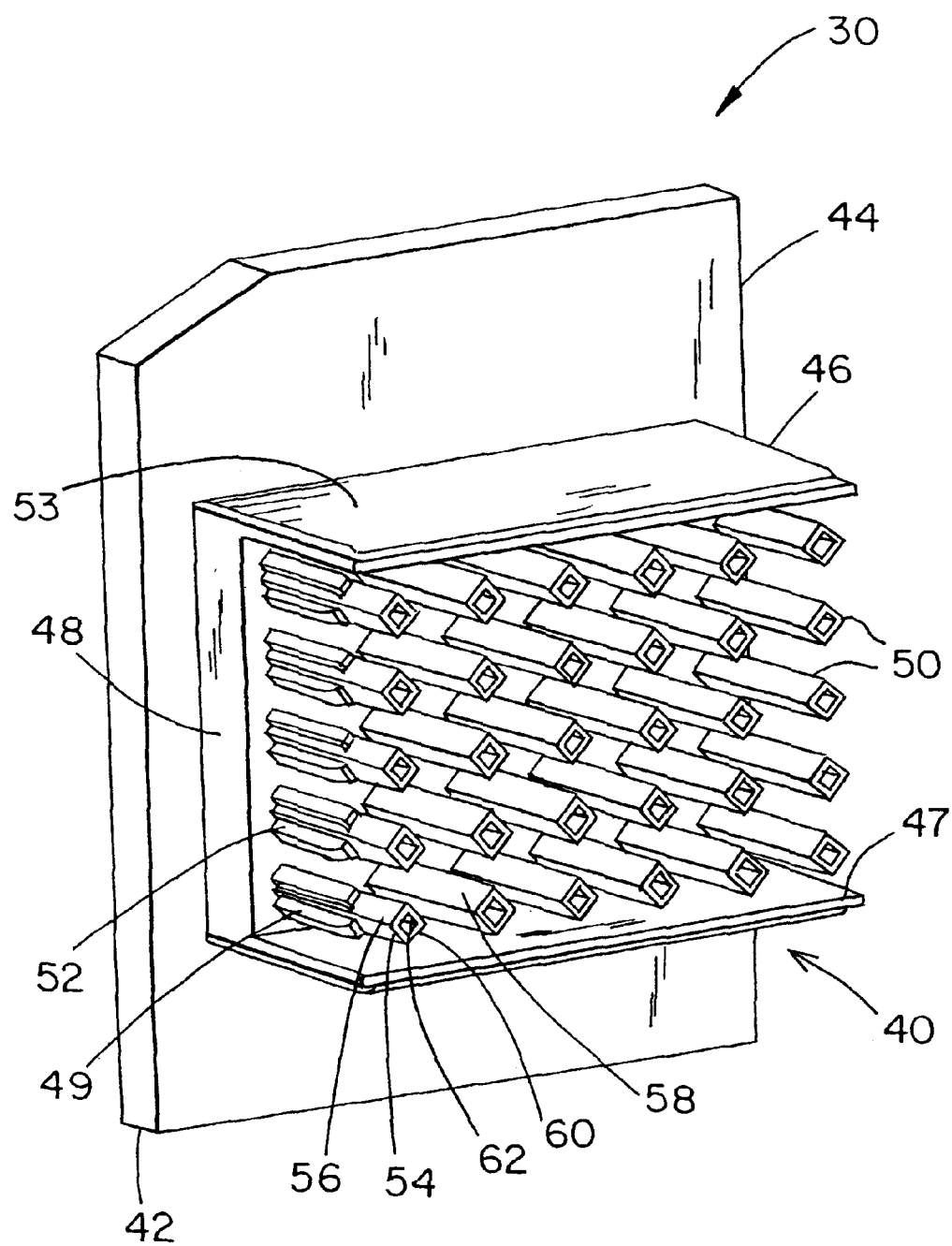
FIG. 1A is a perspective view of a backpanel connector used in the electrical interconnect system according to the present invention.
Figure 1B:
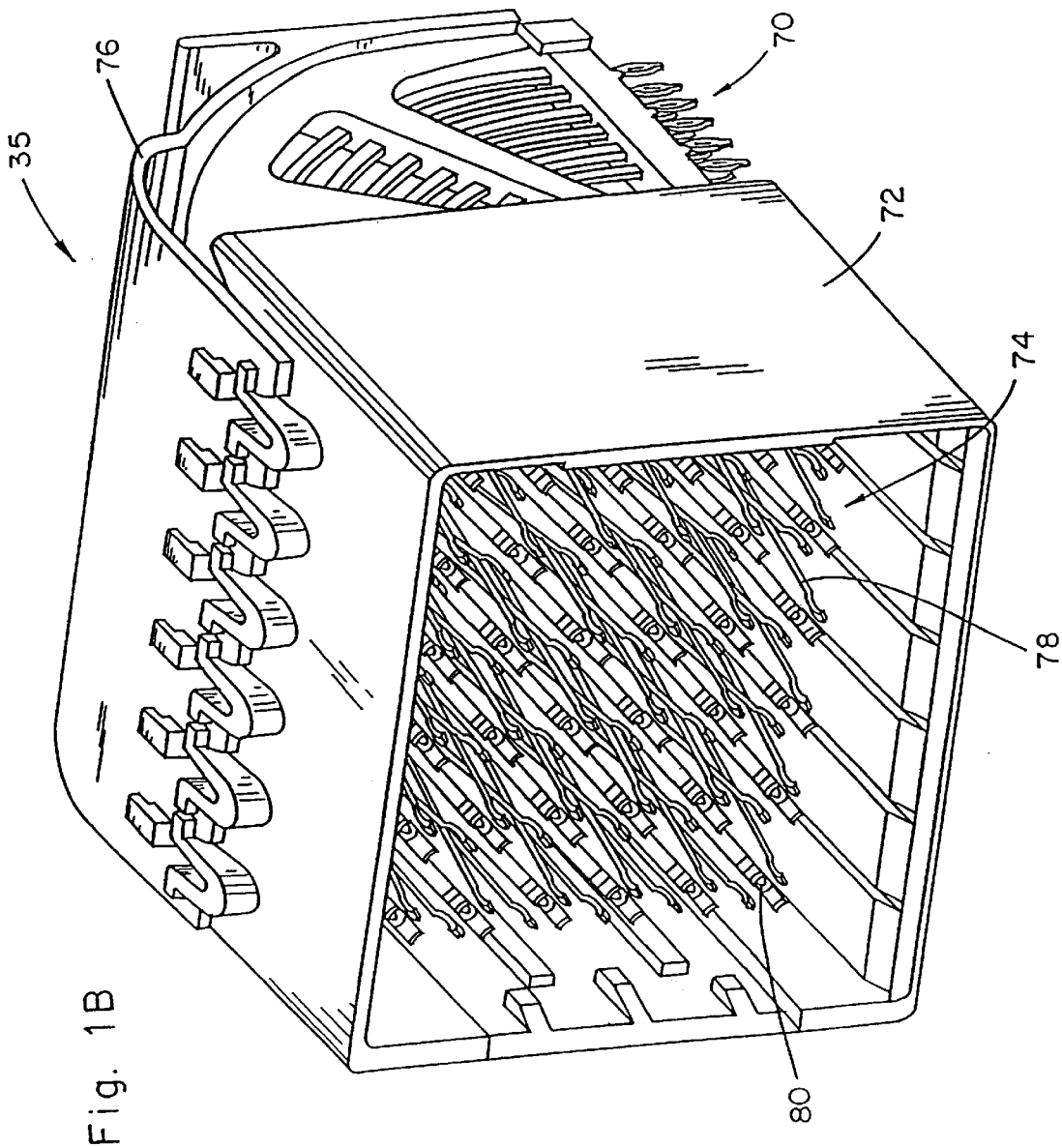
FIG. 1B is a perspective view of a daughter card connector used in the electrical interconnect system according to the present invention.

Referring first to the drawings, FIGS. 1A and 1B depict a high-density electrical interconnect system 30 including a backpanel connector 40 and a daughter card connector 35 according to the present invention. One side of the backpanel connector 40 is mounted to a backpanel 42 and one side of the daughter card connector 35 is mounted to a daughter card (not shown) so that the electrical interconnect system 30 can be used to effect electrical interconnection of a large number of electrical signals between the backpanel 42 and the daughter card when the backpanel connector 40 and a daughter card connector 35 are mated together. As can be appreciated, the principles of the present invention can be applied to devices other than daughter cards and backpanels and such are only used herein for descriptive purposes. For example, instead of right angle connection depicted in FIG. 1, the daughter card connector could be a straight connector. As depicted, the invention is described with respect to a horizontal orientation although the invention is usable in any orientation. As is later described, the backpanel connector 40 and the daughter card connector 35 each include grounding means to avoid cross-talk between signals carried on adjacent pins and the introduction of other spurious signals into the signal path on either the daughter card or the backpanel 42.

The backpanel 42 can be formed of a conventional multi-layer printed circuit card having high-density electrical signal paths (not shown). The backpanel connector 40 includes a body 44 having side walls 46, 47 and a base 48. A plurality of upstanding pillars 50 are formed in columns and rows in a 6×6 grid array for convenience. Any column and row grid pattern can be used. For example, a 6×12, a 4×6 and 4×12 are contemplated. The 6×6 grid array is longer in the horizontal direction than in the height direction as depicted in FIG. 1. The sidewall 46 includes a longitudinally extending metallic plate 53 attached to an outer surface of the sidewall 46. The plate 53 is press-fit to the ground plane in the backpanel connector 40. Alternatively, the metallic plate 53 could be formed by spraying an electrically conductive coating and then connecting same to the ground plane in the backplane 42. The sidewall 46 is thus effectively thicker than the sidewall 47 to provide polarity as discussed in detail below. Although thirty-six pillars 50 are depicted, any number of pillars can be used. The backpanel connector 40 includes multiple projecting assemblies 49 which include the pillar 50 and the signal contacts 52. Each of the projecting assemblies includes multiple sets 51 (FIG. 2A) of projecting electrical signal contacts 52 arranged in sets of four around a central insulator pillar 50. The body 44 including side walls 46, 47 the base 48 and the central insulator pillars 50 is preferably molded integrally from a thermoplastic polyester which is an electrically non-conductive plastic material.

The electrical interconnect system of the present invention includes a plurality of conductive contacts arranged in groups or sets, and each group is arranged in a grid of groups of contacts to form a grid arrangement. Each group of conductive contacts may constitute the conductive section of a projection-type interconnect component that is configured for receipt within a corresponding receiving-type interconnect component which includes a plurality of conductive beams or, alternatively, each group of conductive contacts may constitute the conductive section of a receiving-type interconnect component configured to receive a corresponding projection-type interconnect component. The conductive beams mate with the conductive posts when a projection-type interconnect component is received within a corresponding receiving-type interconnect component. The groups of contacts are arranged in rows and columns. For each group of contacts, there is a set of four signal contacts and a central ground contact. The projection type interconnect component (backpanel connector 40) includes projecting type signal contacts and a receiving type ground contact. The receiving type interconnect component (daughter card connector 35) includes receiving type signal contacts and a projection type ground contact.

The pillars 50 are each hollow and have a rectangular exterior with surfaces 54, 56, 58, 60. For each pillar 50, a set of one of the four projecting signal contacts 52 abut the surfaces 54, 56, 58, 60, respectively. The surfaces 54, 56, 58, 60 are each oriented at approximately 45 degrees relative to the sidewalls 46, 47 as depicted in FIGS. 1A and 1B. As depicted in FIG. 2B, the surfaces 54, 56, 58, 60 each include centrally located inwardly extending recesses 63, 64, 65, 66, respectively. Advantageously, the recesses 63, 64, 65, 66 are sized to accept lateral edges of the signal contacts 52 to prevent lateral movement thereof. The projecting signal contacts 52 are electrically isolated from one another by the base 48 and the pillar 50. The projecting signal contacts 52 are inserted through the base 48 as described below. For each pillar 50, a central ground contact 62 is positioned in the hollow pillar 50 and is electrically isolated from the projecting signal contacts 52 by the pillar 50.

The daughter card connector 35 includes a plurality of wafer assemblies 70 each connected to a hood enclosure 72. The hood enclosure 72 is made of electrically conductive material to reduce cross-talk between adjacent signal contacts. As depicted in FIG. 1B, there are six pairs of wafer assemblies 70 each having six sets of contacts 74 for a total of thirty-six sets of contacts corresponding to the thirty-six pillars 50. The wafer assemblies 70 are held together using an electrically conductive stiffener 76 which is also connected to the hood enclosure 72. Each set of contacts 74 includes four beam signal contacts 78. The beam signal contacts 78 include beam sections for mating with the projecting signal contacts 52 of the backpanel connector 40 as described in detail below. A central ground contact post 80 is positioned centrally between the four beam signal contacts 78 for mating with the central ground contact 62 in the backpanel connector 40.

In an alternative arrangement, either the central ground contact 62 or the central ground contact post 80 can be omitted. Either the remaining ground contact 62 or post 80 would then function as a ground shield. Spurious noise and signals would be carried by the contact 62 or post 80 to a respective ground plane in either the backplane 42 or daughter card. Also, alternatively the ground contact 62 and the contact post 80 could be arranged so that the contact 62 and the post 80 do not contact each other when the connectors 35, 40 are brought into the mated condition. In this manner, both the ground contact 62 and the contact post 80 function as ground shields.

Each of the wafer assemblies 70 comprises several electrically conductive contacts 78 which include flexible beams 190. Preferably, the material of the wafer is an insulative material thermoplastic polymer (Hoescht Celanese 3316). Portions of the signal contacts 78 bend away from each other to receive the projection-type interconnect component within the space between the flexible beams.

Each signal contact 78 may be formed from the same materials used to make the signal contacts 52 of the projection-type electrical interconnect component. For example, each contact 78 may be formed of beryllium copper, phosphor bronze, brass, or a copper alloy, and plated with tin, gold, palladium, or nickel at a selected portion of the conductive beam which will contact a conductive post of the projection-type interconnect component when the projection-type interconnect component is received within the receiving-type interconnect component 35.

Figure 14:
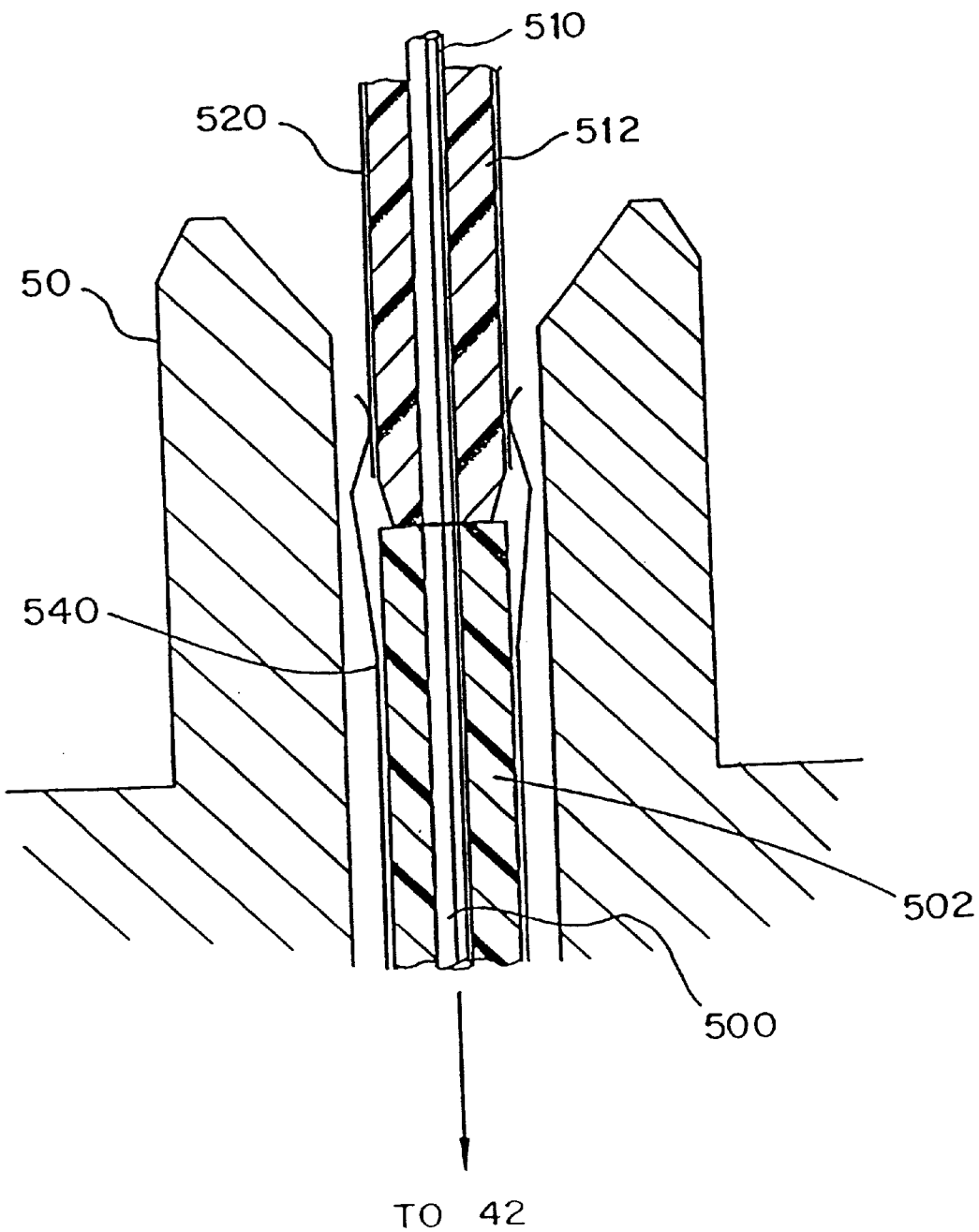
FIG. 14 is a side elevational cross-section of an optical embodiment according to the present invention.

Alternatively, instead of contacts 78 and 52 carrying signals, these contacts 52, 78 could be used as grounds and the contacts 62, 80 could carry signals. This alternative arrangement has the disadvantage of carrying fewer signals per square inch but the alternative arrangement would approach the performance of coaxial interconnect device. This alternative arrangement can be considered as psuedo-coax where each of the central signal carrying contact is surrounded by four ground contacts. Because each of the signal carrying contacts is not surrounded by 360 degrees of ground, the arrangement is considered to be pseudo-coax. The center grounds 62, 80 could be replaced with optical interconnect devices (FIG. 14). Also the central contact could be replaced by shielded coaxial cable having a braid. The braid can act as a ground. The center post can be used to support an optical fiber which can be mated with a corresponding optical fiber in the daughter card connector 35. The ends of the optical fiber would be polished to optically transmit a signal.

Figure 2A:
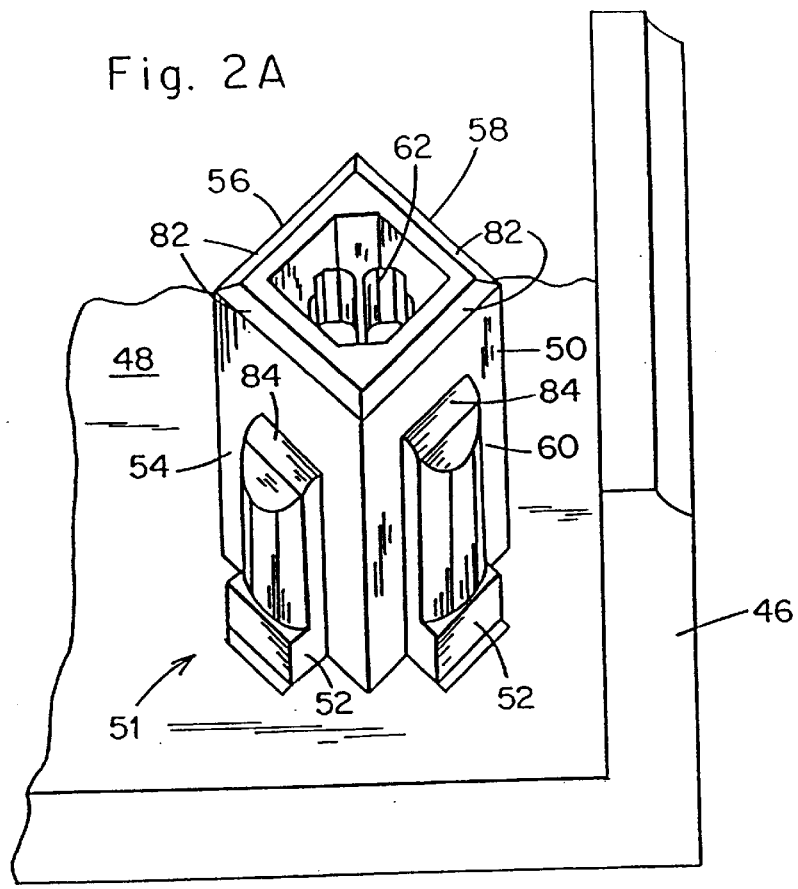
FIG. 2A is a perspective view of a projecting assembly used in the backpanel connector.
Figure 2B:
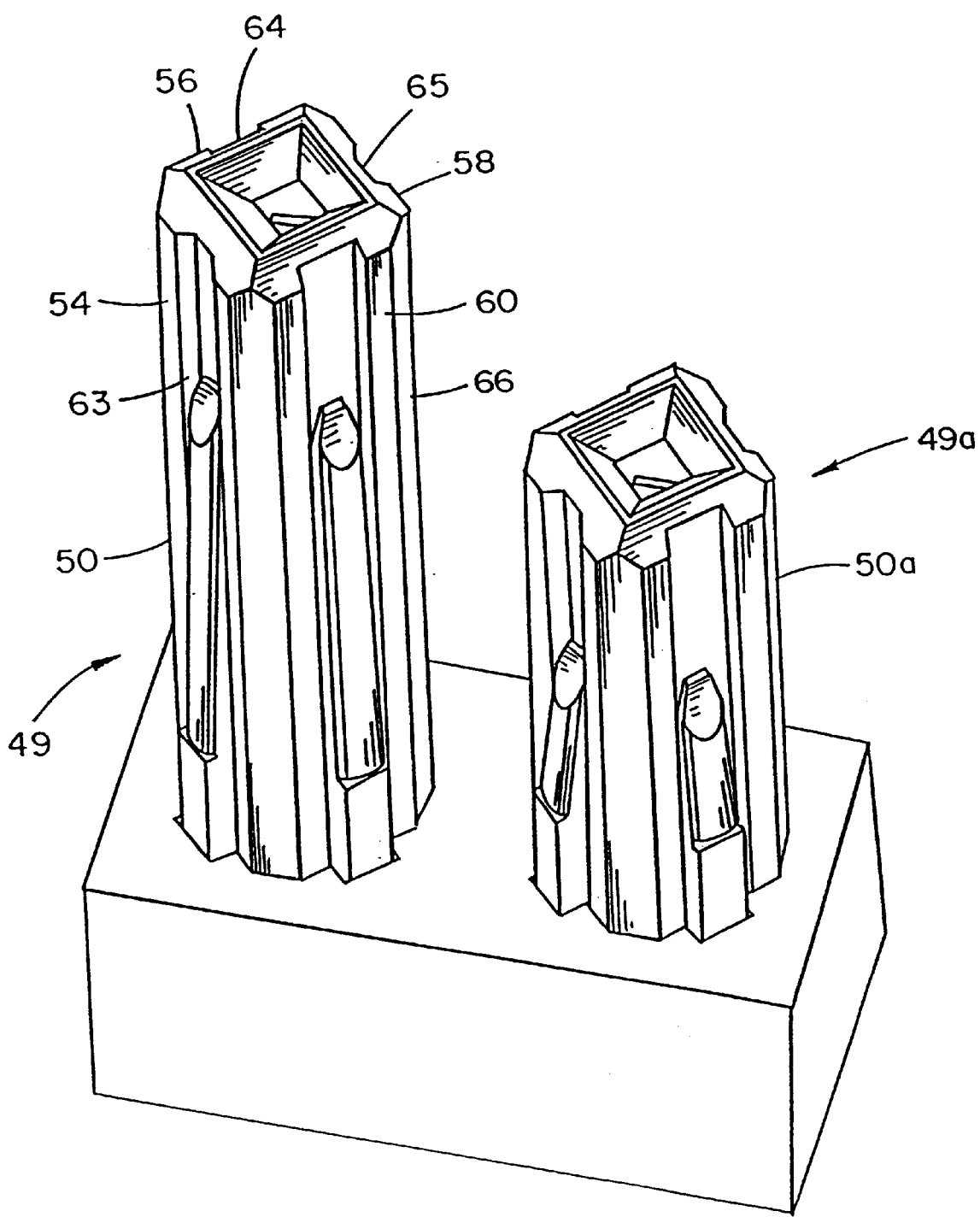
FIG. 2B is a perspective view of two projecting assemblies having different heights.

FIG. 2A is an enlarged view of a portion of the backpanel connector 40 depicting one pillar 50 and a set of the four signal contacts. In FIG. 2A, the surfaces 54, 56, 58, 60 of pillar 50 are depicted having tapered upper sections 82 to facilitate guiding the beam signal contacts 78 from the daughter card connector 35 onto the projecting signal contacts 52. The projecting signal contacts 52 have rounded upper sections 84 which further act to guide and effect a secure mechanical and electrical contact between projecting signal contacts 52 in the backpanel connector 40 and the beam signal contacts 78 in daughter card connector 35 when the electrical interconnect system is mated. The ground post 62 is positioned in each pillar 50. The ground posts 62 may be commonly connected to a ground plane within the backpanel 42.

FIG. 2B depicts two pillars 50, 50a which are identical except for the height of the pillars 50, signal contacts 52 and central ground contact 62. The different heights can provide for sequencing of contact. For example, the taller pillar and signal contacts 52 in the backplane connector 40 may contact the contacts 78 in the daughter card connector 35 first.

Figure 2C:
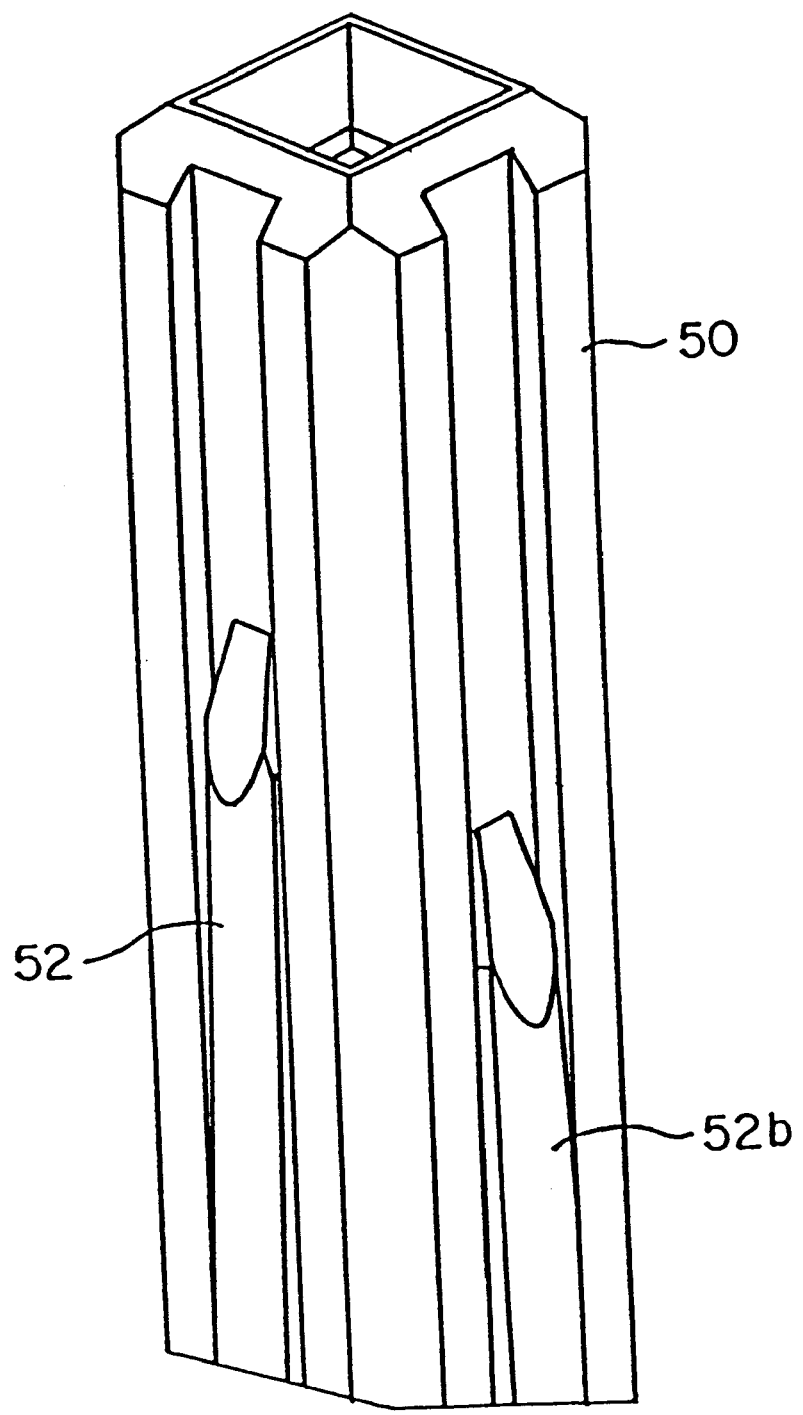
FIG. 2C is a perspective view of a projecting assembly having signal contacts of different heights.

FIG. 2C illustrates that a pillar 50 can have signal contacts 52, 52b of different heights. Sequencing may be achieved by varying the signal contact 52 height within the same pillar arrangement.

Figure 3B:
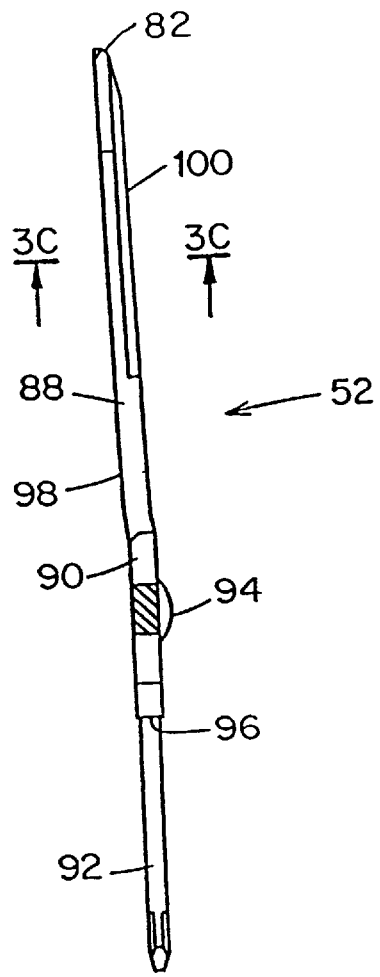
FIG. 3B is a side elevational view of FIG. 3A.
Figure 3A:
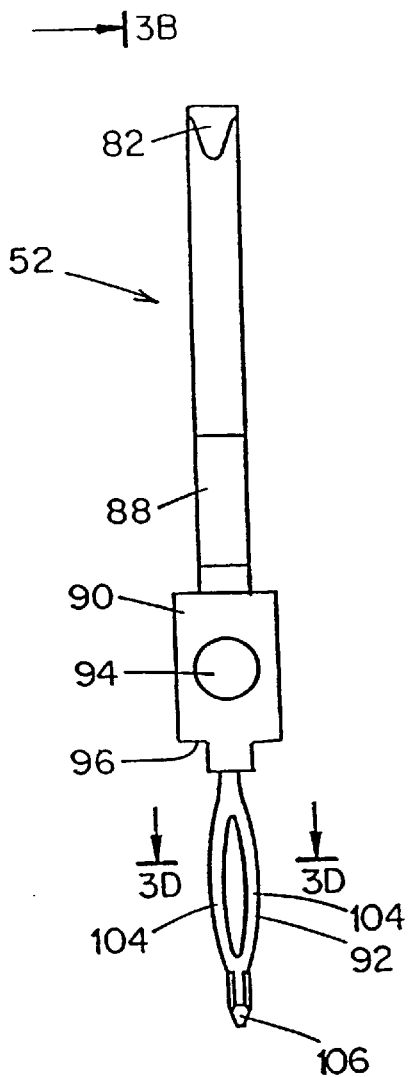
FIG. 3A is a front elevational view of an electrical contact for the projecting portion according to the present invention.
Figure 3C:
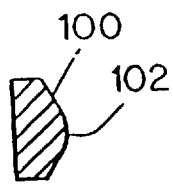
FIG. 3C is a cross-sectional view taken along line 3C—3C in FIG. 3B.
Figure 3D:
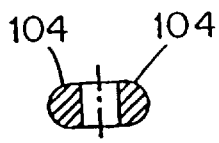
FIG. 3D is a cross-sectional view taken along line 3D—3D in FIG. 3A.

Referring now to FIG. 3A, each projecting signal contact 52 includes three contiguous sections: a contact portion 88, an intermediate portion 90, and a press-fit portion 92. In FIG. 2, the contact portion 88 of each conductive post is shown in a position adjacent to and in contact with the pillar 70. The intermediate portion 90 is the portion of each projecting signal contact 52 that is secured to the base 48. The press fit portion 92 extends below the base 48 and into the backpanel 42. As depicted in FIG. 3B, a round press fit portion 94 extends from the intermediate portion 90 in a transverse direction for securing the projecting signal contact 52 to the base 48. The intermediate portion 90 has a lower surface 96 to be brought into contact with a corresponding surface in the base 48. As depicted in FIG. 3B, the contact portion 88 has a flat surface 98 for contact with a corresponding surface 54–60 on the pillar 50. As depicted in FIG. 3B, the contact portion 88 of the projecting signal contact 52 includes a curved contact surface 100 having a peak 102, as depicted in FIG. 3C. As depicted in FIG. 3A, the press-fit portion 92 has two opposed spring like members 104 depicted in cross-section in FIG. 3D. The press-fit portion 92 also has a lead-in portion 106 at a distal end thereof.

The press-fit portion 92 shown is one type that may be used. Other press-fit configurations may be substituted as required. Other termination methods not described here may be used if necessary, i.e., surface mount or through hole solder type.

When the projection-type interconnect component 40 is received within a corresponding receiving-type interconnect component 35, electrical signals may be transferred from the press-fit portion 92 of each projecting signal contact 52 through the intermediate portion 90 and the contact portion 88 of projecting signal contact 52 to the receiving-type interconnect component (beam signal contact 78), and vice versa.

Each projecting signal contact 52 may be formed of beryllium copper, phosphor bronze, brass, a copper alloy, tin, gold, palladium, or any other suitable metal or conductive material. In a preferred embodiment, the projecting signal contact 52 is formed of beryllium copper, phosphor bronze, brass, or a copper alloy, and plated with tin, gold, palladium, nickel or a combination including at least two of tin, gold, palladium or nickel. The entire surface of each projecting signal contact 52 may be plated or just a selected portion corresponding to the portion of projecting signal contact 52 that will contact a beam signal contact 78 when the projection-type interconnect component is received within the corresponding receiving-type interconnect component.

The daughter card connector 35 includes thirty-six sets 74 of four beam signal contacts 78. The beam signal contacts 78 may be arranged in groups of four to electrically interconnect with projecting signal contacts 52 when daughter card connector 35 is mechanically connected with the backpanel connector 40. The center of each group of signal contacts 78 includes the central ground contact post 80 which is received by ground contact 62 when the daughter card connector 35 is mated with the backpanel connector 40.

Figure 4A:
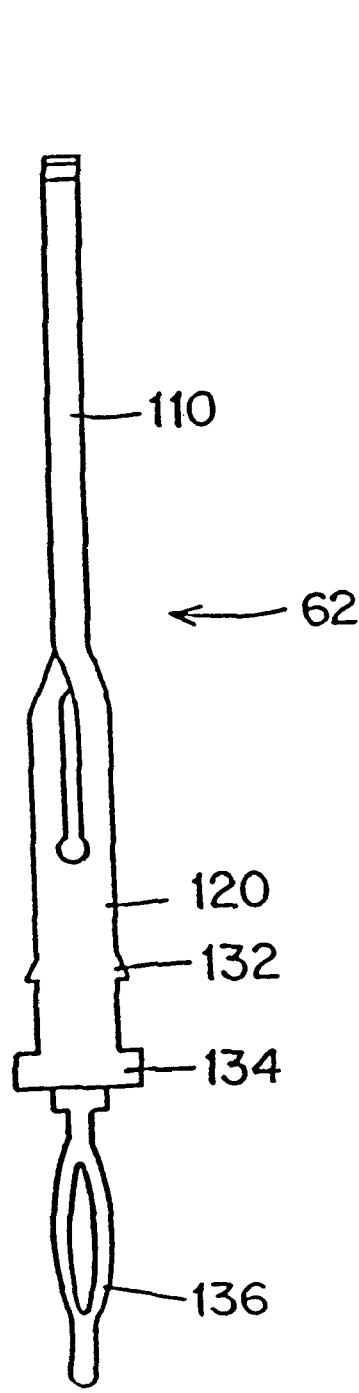
FIG. 4A is a side elevational view of a central ground contact post used in the projecting portion in the backpanel connector according to the present invention.
Figure 4B:
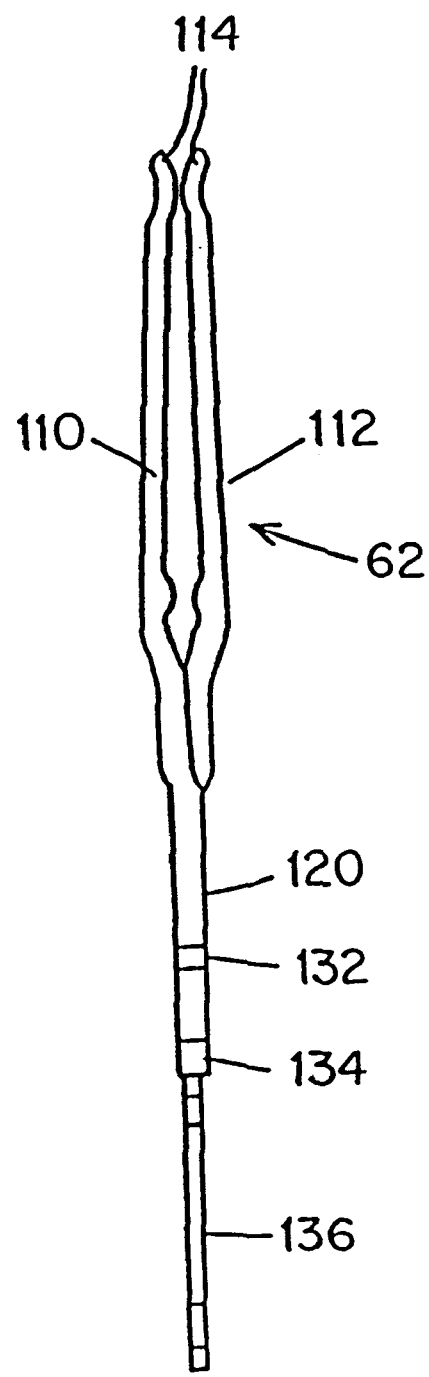
FIG. 4B is a side elevational view of the central ground contact post of FIG. 4A.

Referring now to FIGS. 4A and 4B, the central ground contact 62 is depicted having a pair of opposed flexible legs 110, 112 for mating with central ground contact post 80. The legs 110, 112 each have at their distal ends curved portions 114 for facilitating insertion of central ground contact post 80. The central ground contact 62 is formed from a flat sheet of material and is stamped and flexible legs 110, 112 are twisted from an initially flat position 90 degrees to oppose each other as depicted in FIG. 4A.

At intermediate portions of the curved portions 114, the curved portions 114 extend toward each other and then away at the distal ends of the curved portions 114. The central ground contact 62 has an intermediate portion 120 extending from the legs 110, 112. The central ground contact 62 is pressed into the base 48 through a hole 130 from the bottom side of the base 48 as explained in detail below. The central ground contact 62 is retained by an angled portion 132 spaced from a base portion 134. The angled portion 132 is spaced from the base portion 134 a distance equal to the thickness of the base 48. The angled portion 132 is sized and shaped to deflect the plastic material surrounding the hole in the base 48 so that the central ground contact 62 is permanently retained by the base 48. The base portion 134 extends outwardly from the intermediate portion 120 a further distance than the angled portion 132. A press-fit portion 136 extends downwardly from the intermediate portion 120 so that the central ground contact 62 can be press-fit into the back plane 42. The press fit portion 136 can be identical to the press fit portion 92 described previously. Alternatively, other electrical connection methods can be used.

The configuration of the press-fit portion 136 of each of the projecting signal contacts 52 depends on the type of device with which that press-fit portion 136 is interfacing. For example, instead of a press-fit portion, portion 136 can have a rounded configuration if interfacing with a through-hole of a printed wiring board. Other configurations may also be used. See for example the press-fit pin disclosed in expired U.S. Pat. No. 4,017,143, the teachings of which are hereby incorporated by reference in their entirety into the present disclosure.

Figure 5B:
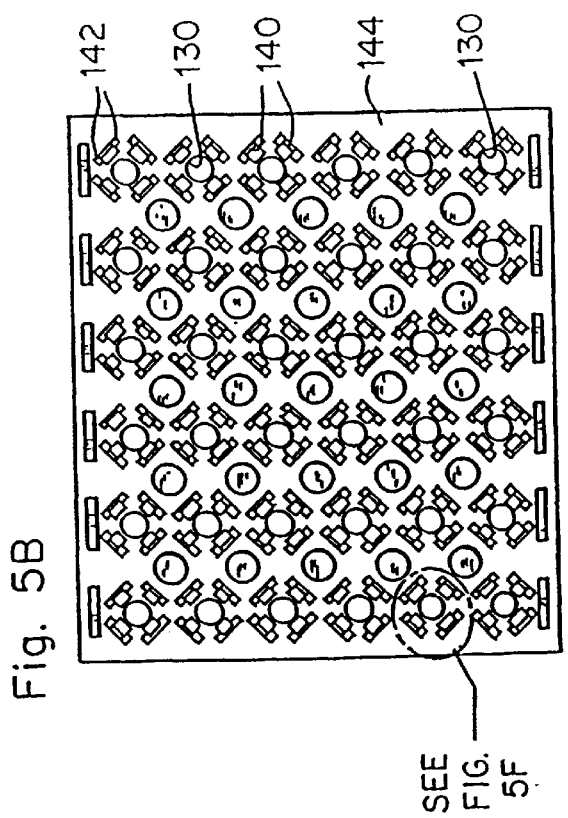
FIG. 5B is a bottom plan view of an alternative embodiment of FIG. 5A.
Figure 5C:
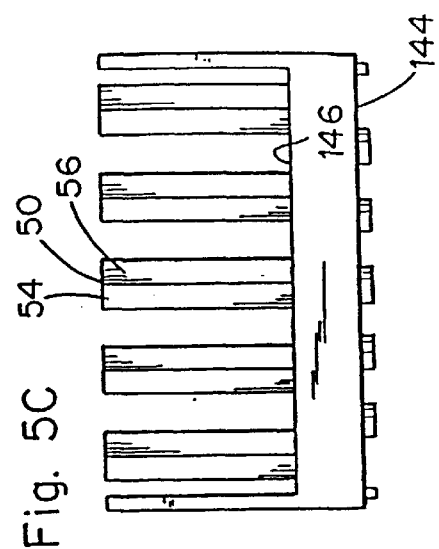
FIG. 5C is a side elevational view of the connector of the backpanel connector to FIG. 5A.
Figure 5A:
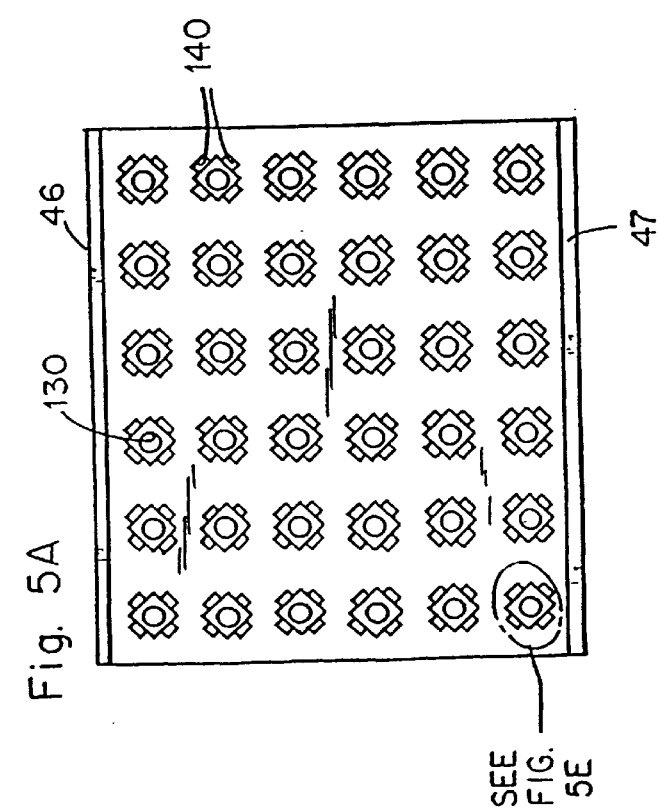
FIG. 5A is a top plan view of a base portion of the backpanel connector according to the present invention.

FIGS. 5A–5F depict the body 44 of the backpanel connector 40 without either of the signal contacts 52 or the central ground contact 62 inserted therein for clarity. As depicted in FIG. 5A, the holes 130 are located inside one of the corresponding pillars 50. Adjacent each of the pillars 50 are four slots 140 through which signal contacts 52 are inserted. As depicted in FIG. 5B, the shoulders 142 are formed which extend inwardly from a lower surface 144 of the base 48. As depicted in FIG. 5C, the pillars 50 extend upwardly from an upper surface 146. As depicted in FIG. 5D, the hole 130 is octagonal. As depicted in FIG. 5E, a shoulder 146 is formed outwardly from the hole 130. The ground contact 62 is inserted into the hole 130 and the base portion 134 is brought into contact with the shoulder 146. The intermediate portion 90 is in contact with the shoulder 142.

The receiving-type electrical interconnect component of the present invention includes several electrically conductive beams 190 (see FIG. 6A) preferably embedded in an insulative frame. The receiving-type electrical interconnect component is configured to receive a corresponding projection-type electrical interconnect component within a space between the conductive beams. The insulative frame insulates the conductive beams from one another so that a different electrical signal may be transmitted on each beam.

Figure 6B:
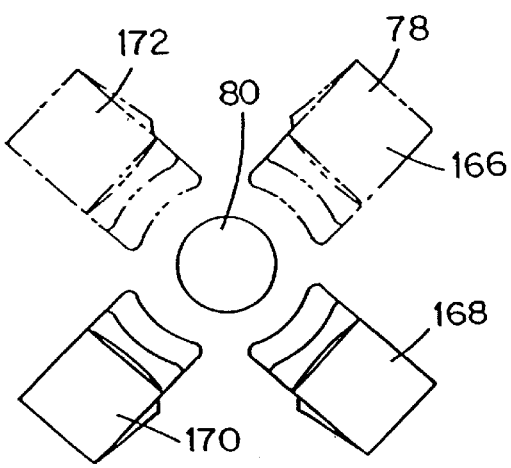
FIG. 6B is a front elevational view of an arrangement of contacts and central ground contact of FIG. 6.

FIG. 6A illustrates a wafer assembly 70 attached to the stiffener 76 to form a portion of the receiving-type interconnection component 50 in accordance with an embodiment of the present invention. Each of the wafer assemblies 70 includes a right wafer assembly 162 and a left wafer assembly 164. As depicted in FIG. 6B, each set or group of the signal contacts 74 includes four signal contacts 166, 168, 170 172 arranged at right angles to each around the central ground contact post 80. As depicted in FIG. 6A, signal contacts 166, 168 are part of the right wafer assembly 162 and signal contacts 170, 172 are part of the left wafer assembly 164. As depicted in FIG. 6A, all of the signal contacts are positioned at 45 degrees from vertical.

As depicted in FIG. 6A, the wafer assembly 70 includes a right frame 180 and a left frame 182 which is injection molded around the plurality of signal contacts 78. Each of the frames includes a single column having six signal contacts 78. Each of the signal contacts 78 is formed in a 90 degree arc and is formed such that contacts 78 have a flexible beam portion 190 extending from front surfaces 240, 242 of the right frame 180 and the left frame 182. Each of the frames 180, 182 has a pie shape. Each signal contact 78 includes press-fit portions 200, 202 which extend downwardly from frames 180, 182, respectively, for electrical interconnection with a daughter card. The press-fit portions on both the daughter card connector 35 and the backpanel connector 40 advantageously avoids soldering the connector to a circuit board. The press-fit connection avoids desoldering should the connector need to be repaired or removed from the printed circuit board which can be difficult because of the high density of the electrical interconnection system of the present invention. Alternatively, instead of press-fit portions 200, 202 other contact type portions or other portions can be used. As depicted in FIGS. 6A and 6B, the central ground contact post 80 is located between a set of four conductive contacts 78. The wafer assemblies 180, 182 provide a right angle connection between the daughter card and the backpanel connector 42.

FIG. 6A depicts that adjacent sets of signal contacts from the daughter card may have ground pins 262 (ends not shown) interweaved therewith to reduce cross-talk from signals carried on adjacent pairs of contacts 18. Needless to say, the contacts 78 and the ground pins 262 are formed and maintained to ensure isolation between the signal carrying contacts 78 and the ground pins 262. To facilitate installation, either the signal contacts 78 or the ground pins 262 can have insulated portions to reduce the possibility of electrical shorting between the central ground post 80 and the signal contacts 78. For example, portions of each signal contact can be formed with an insulated section, for example, by spraying a plastic insulation onto portions of the signal contacts to avoid having the signal pins from shorting out against the ground pins 262.

Figure 7:
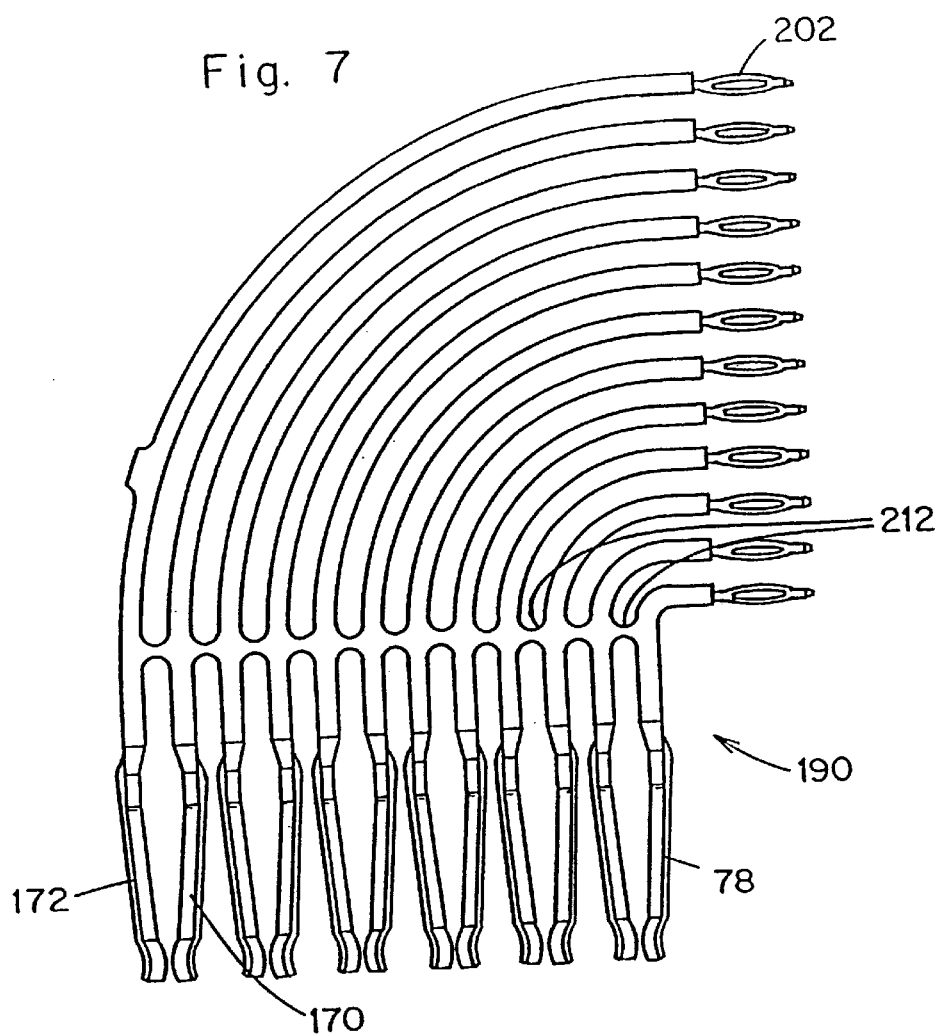
FIG. 7 is a side elevational view of a stamped contact frame before insert molding.

As depicted in FIG. 7, a stamped frame 210 used in assembling the left wafer assembly 164 is depicted in which adjacent signal contacts 78 are connected by tabs 212. The interconnection of signal contacts using tabs 212 permits the stamped frame 210 to be placed in an insert reel-to-reel mold and have plastic embedded around the stamped frame 210. The tabs 212 are removed after the insert injection molding process is completed.

Each of the frames 180, 182 each include a front frame portion 220, a lower frame portion 222, a curved frame portion 224, and a left intermediate frame portion 226 and a right intermediate frame portion 228. Because each of the frames is injection molded, frame portions 220–228 are integral with each other. Front frame portion 220 is connected at a lower end thereof to a front end of the lower frame portion 222. The curved frame portion 224 is connected at an upper portion thereof to the front frame portion 222 and a lower portion thereof to the lower frame portion 222. The left and right intermediate frame members 226 and 228 extend from an upwardly extending portion 230 extending from the lower frame portion 222 to intermediate portions of the curved frame member 224 to form a hub and spoke.

Figures 6C, 6D, 6E:
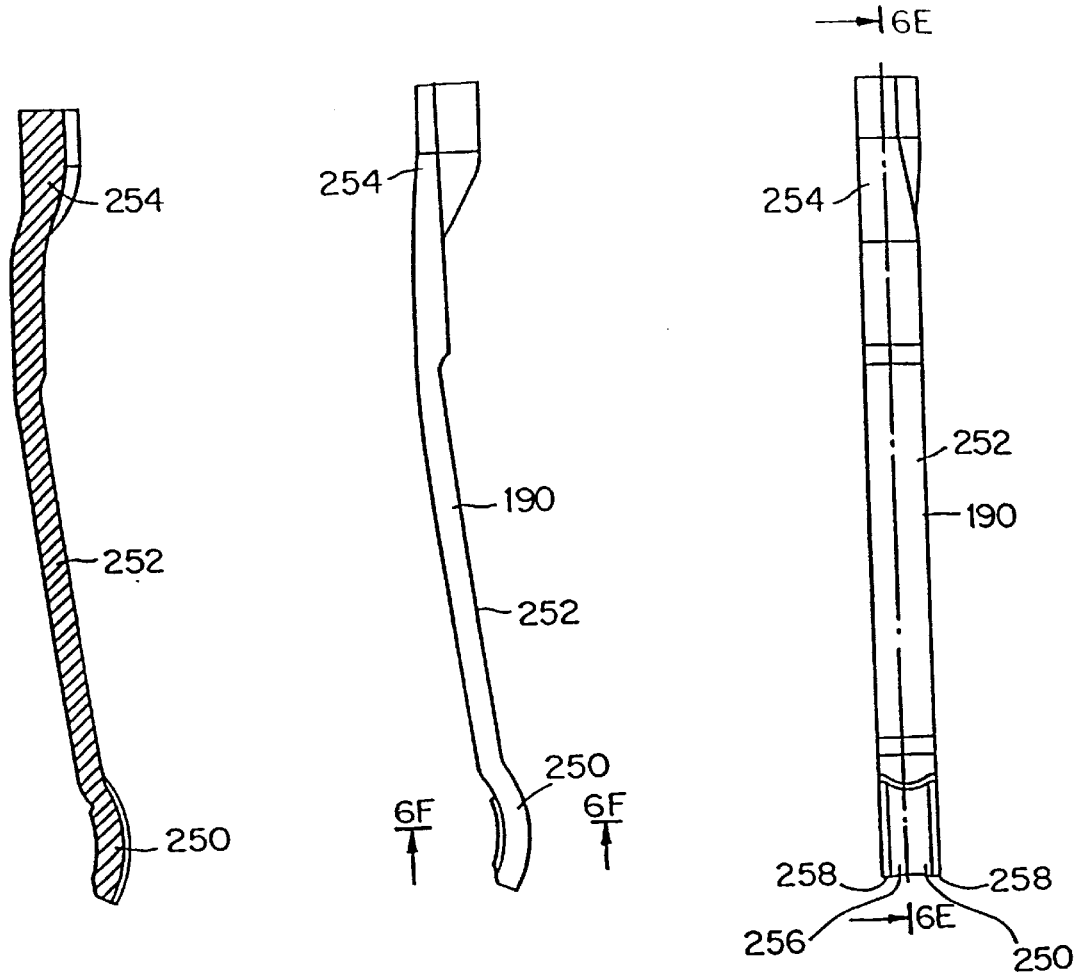
FIG. 6C is a side elevational view of a flexible beam contact of FIG. 6A.
FIG. 6D is a side elevational view taken along lines 6D—6D in FIG. 6C.
FIG. 6E is a cross-sectional view taken along liens 6E—6E in FIG. 6B.
Figure 6F:
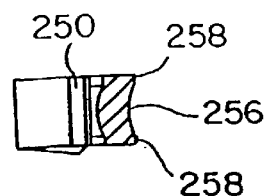
FIG. 6F is a cross-sectional view taken along lines 6F—6F in FIG. 6D.

The beam section 190 of the signal contact 78 is depicted in FIGS. 6C–6F. With reference to FIG. 6C, each flexible signal contact 78 includes the beam portion 190 which itself includes three sections: a contact portion 250, a flexible portion 252, and a stabilizing portion 254.

The contact portion 250 of each beam portion 190 contacts a conductive signal contact 52 of a corresponding projection-type receiving component when the projection-type receiving component is received within the corresponding receiving-type interconnect component. The contact portion 250 of each beam portion includes an interface portion 256 and a lead-in portion 258. The interface portion 256 is the portion of the beam portion 190 which contacts a tapered upper section 82 of the pillar 50 and the rounded upper section 84 of the signal contact 52 when the projection-type and receiving-type interconnect components are mated. The lead-in portion 258 comprises a curved surface which initiates separation of the conductive beams during mating upon coming into contact with the tapered upper surface 82 of the pillar 50 and the rounded upper surface 84 of the signal contact 52.

FIGS. 8A–8D depict the left frame assembly 182. The right frame assembly 180 is symmetrical to the left frame assembly 182 with the exception of a ground contact 300 which is included with one wafer and only a single ground contact 300 per wafer assembly 70. A plurality of curved slots 270, 272, 274, 276, 278, 280 each extending in a 90 degree arc are spaced through left frame 182 for retaining the central ground contact posts 80. More specifically, there are six slots 270–280 which are formed in frame members 220, 226, 228 and 222 to shape the central ground contacts 80 into a 90° arc. The curved slots 270–280 are each spaced from each other with each succeeding slot having a larger radius. The central ground contact posts 80 (not shown in FIG. 8) extend forwardly from the front frame portion 220 along with the beam portions 190 of each of the signal contacts 78. The press-fit portions 202 extend downwardly from the lower frame portion 222.

A plurality of pins 290, 292, 294 extend from the left frame 182. Corresponding holes (not shown) are molded into right frame 180 so that the frames 180 and 182 mate together to form a wafer assembly 70 after the ground contact posts 80 are inserted between the left and right frames 180, 182. A ground contact 300 is optionally embedded into the left frame 182 and has a rearwardly extending portion 302 for contact with the electrically conductive stiffener 76 and a forwardly extending portion 304 for contact with the metallic plate 53. The forwardly extending portion 304 is spring like and forms an electrical connection against the metallic plate 53. Advantageously, the ground contact 300 provides a second grounding method preventing or reducing spurious signals from affecting signals carried by the signal contacts 52, 78. If the ground contact 300 is omitted, then it is not necessary that the stiffener 76 be electrically conductive.

Figures 8A, 8B, 8C:
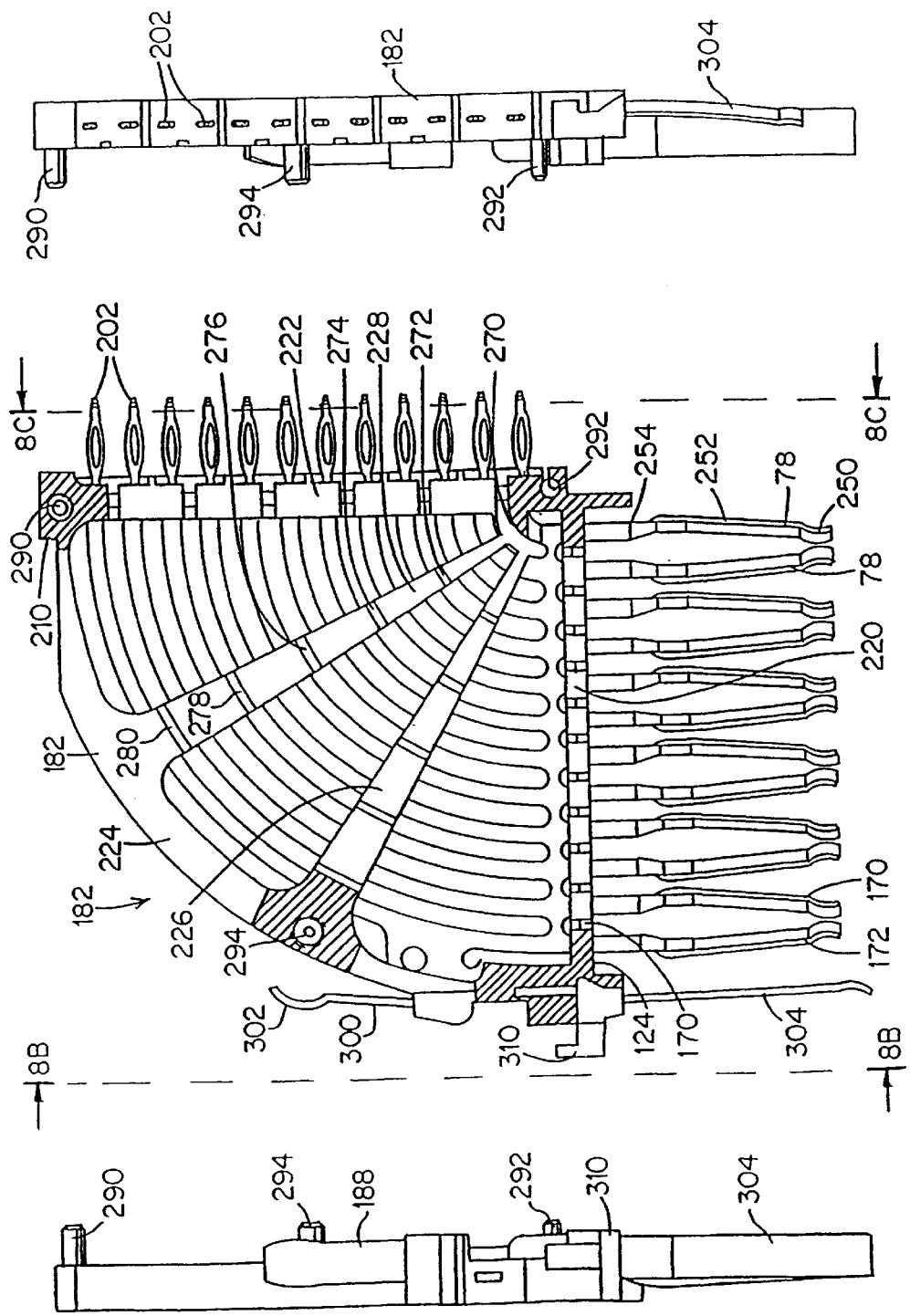
FIG. 8A is a side elevational view of a left wafer assembly according to the present invention.
FIG. 8B is a top elevational view taken along lines 8B—8B in FIG. 8A.
FIG. 8C is a bottom plan view of the wafer assembly of FIG. 8A taken along lines 8C—8C in FIG. 8A.
Figure 9:
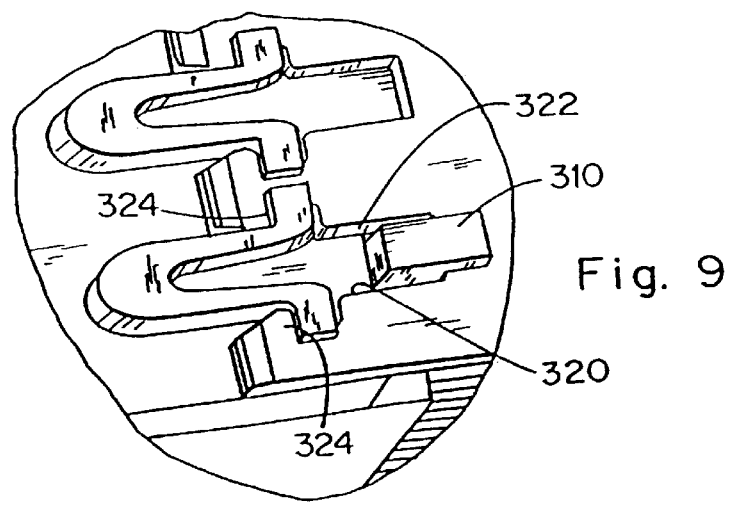
FIG. 9 is an enlarged perspective view of a slot used in retaining wafer, stiffener and hood enclosure.

Referring to FIGS. 6 and 8A, the left wafer includes a tab 310 extending upwardly and rearwardly from the intersection of the front frame portion 220 and the curved frame portion 224 for insertion into a corresponding slot 320 in the stiffener 76. The slot 320 as depicted in FIG. 9 includes a straight section 322 for receiving tab 200 and a pair of transverse receiving slots 324 for receiving a pair of tabs 326 which extend from an upper surface of the hood enclosure 72. The hood enclosure 72 serves to locate and lock the wafer assemblies 70 in position adding stability to the daughter card connector 35 after assembly to the stiffener 76. In addition, the hood enclosure provides alignment and polarization as discussed in detail below when the backplane connector 42 is being mated to the daughter card connector 35.

Figure 10:
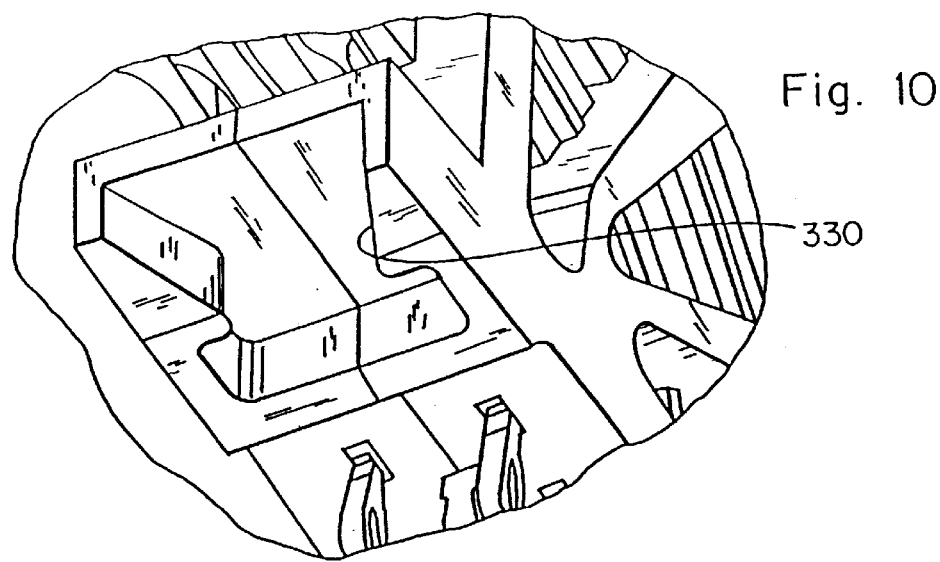
FIG. 10 is an enlarged perspective view of a slot used in retaining the wafer assembly to a hood enclosure.
Figure 11:
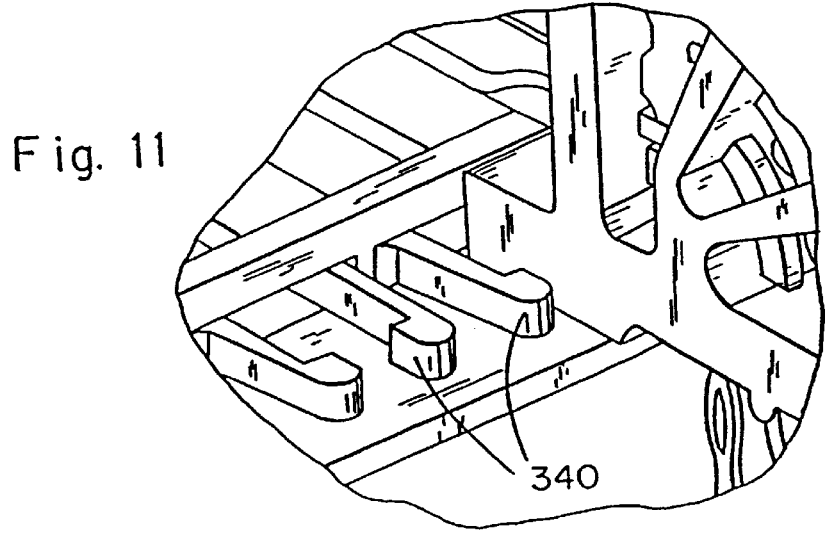
FIG. 11 is an enlarged perspective view depicting the wafer assembly being retained by the hood enclosure.

In FIG. 10, a snap receiving groove 330 is formed on the lower forward surfaces of the right and left frames 180,182 for mating with a pair of engaging members 340 in the hood enclosure 72 as depicted in FIG. 11.

In FIGS. 1 and 12A–12G a front protective member 400 is depicted for protecting the beam portions 190 of the conductive contacts. The sets of contacts 74 are vulnerable to damage without the front protective member 400. The front protective member 400 has a plurality of openings 410 each for receiving a set of contacts 74. Surrounding each of the openings are extending portions 412 which extend from a front surface of the front protective member 400 to close proximity of a front surface of the left and right frame members 180, 182.

Figure 12C:
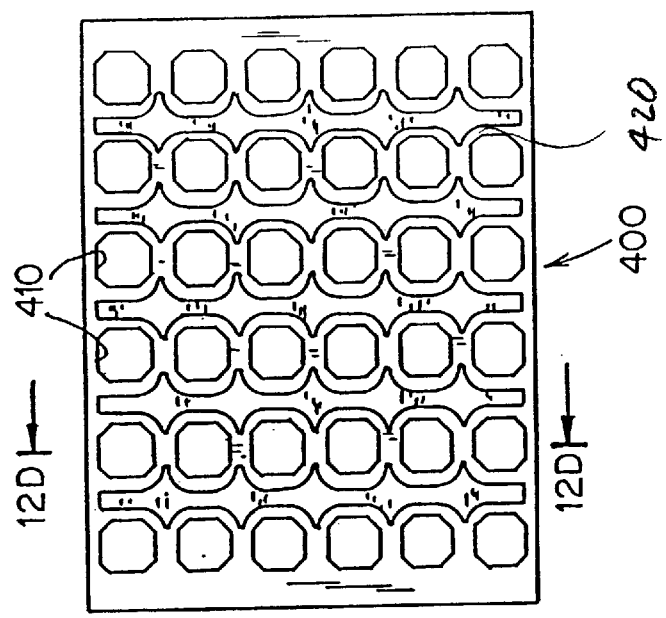
FIGS. 12C is a bottom plan view of the cover of FIGS. 12A.
Figure 12B:
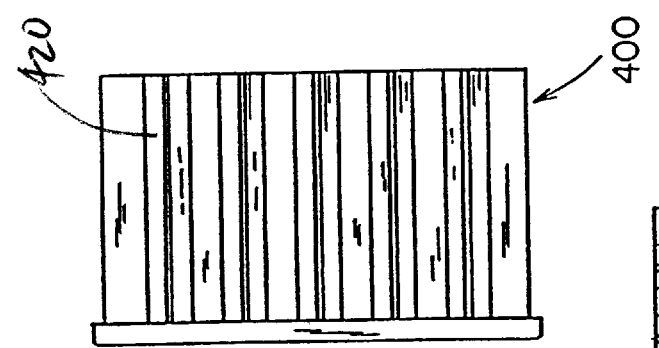
FIG. 12B is a side elevational view of the cover of FIG. 12A.
Figure 12A:
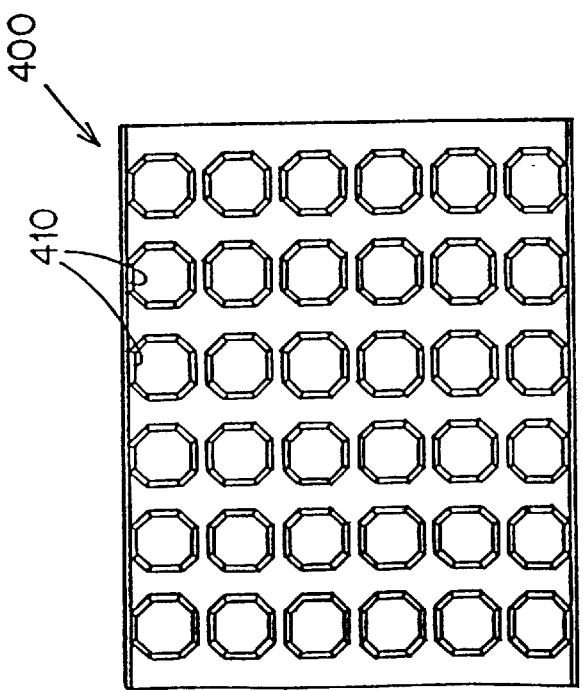
FIG. 12A is a top plan view of a cover according to the present invention.
Figure 12D:
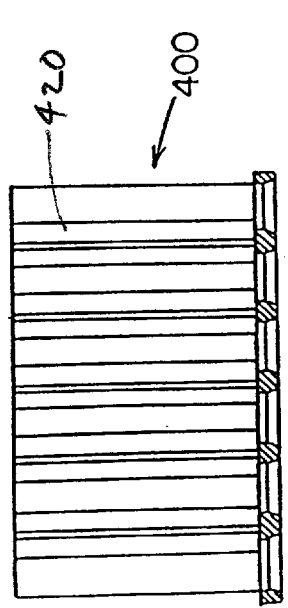
FIG. 12D is a cross-sectional view of the cover of FIG. 12C taken along lines 12D—12D in FIG. 12C.
Figure 12E:
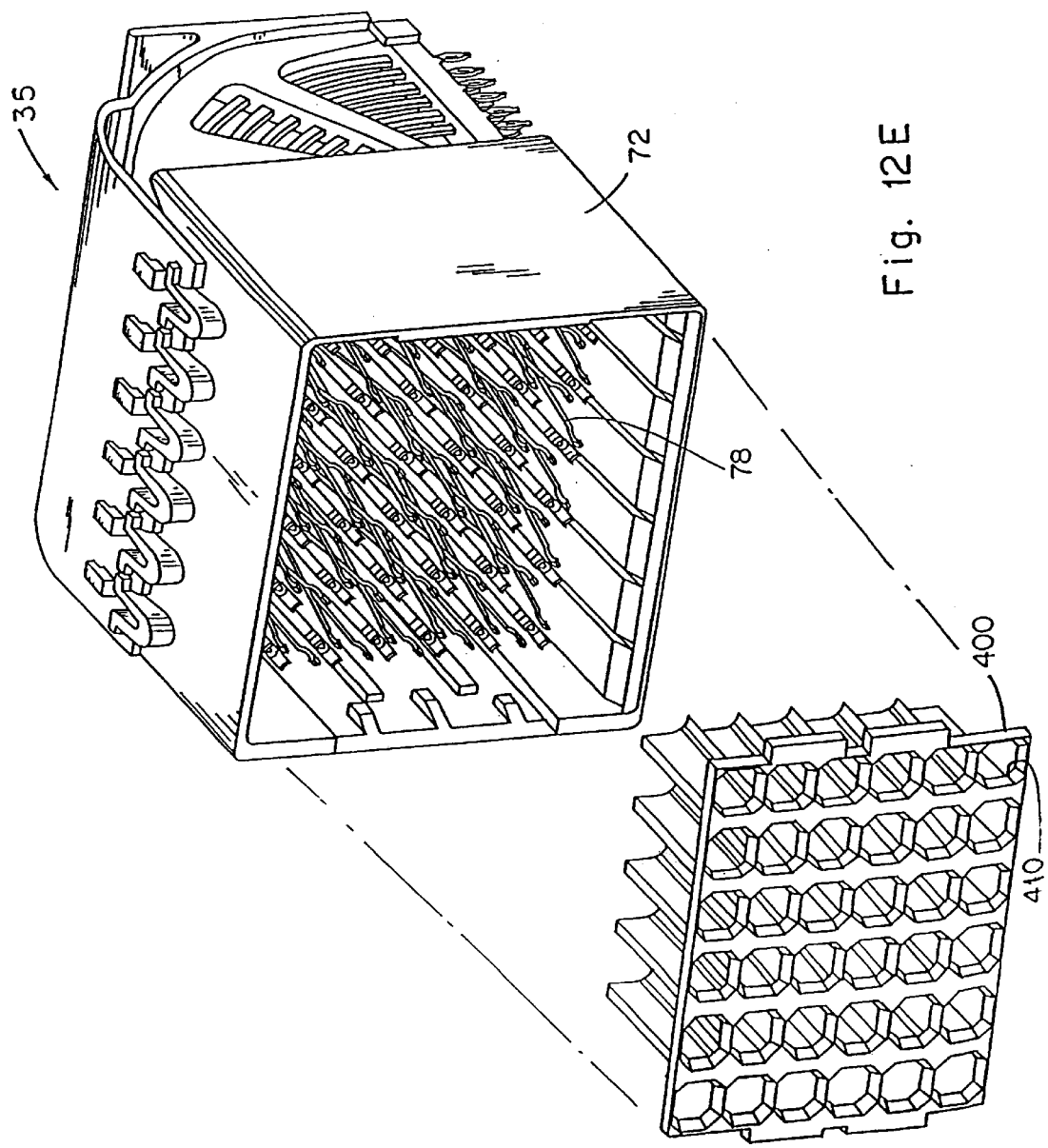
FIG. 12E is an exploded perspective view of the daughter card connector with a cover plate.
Figure 12F:
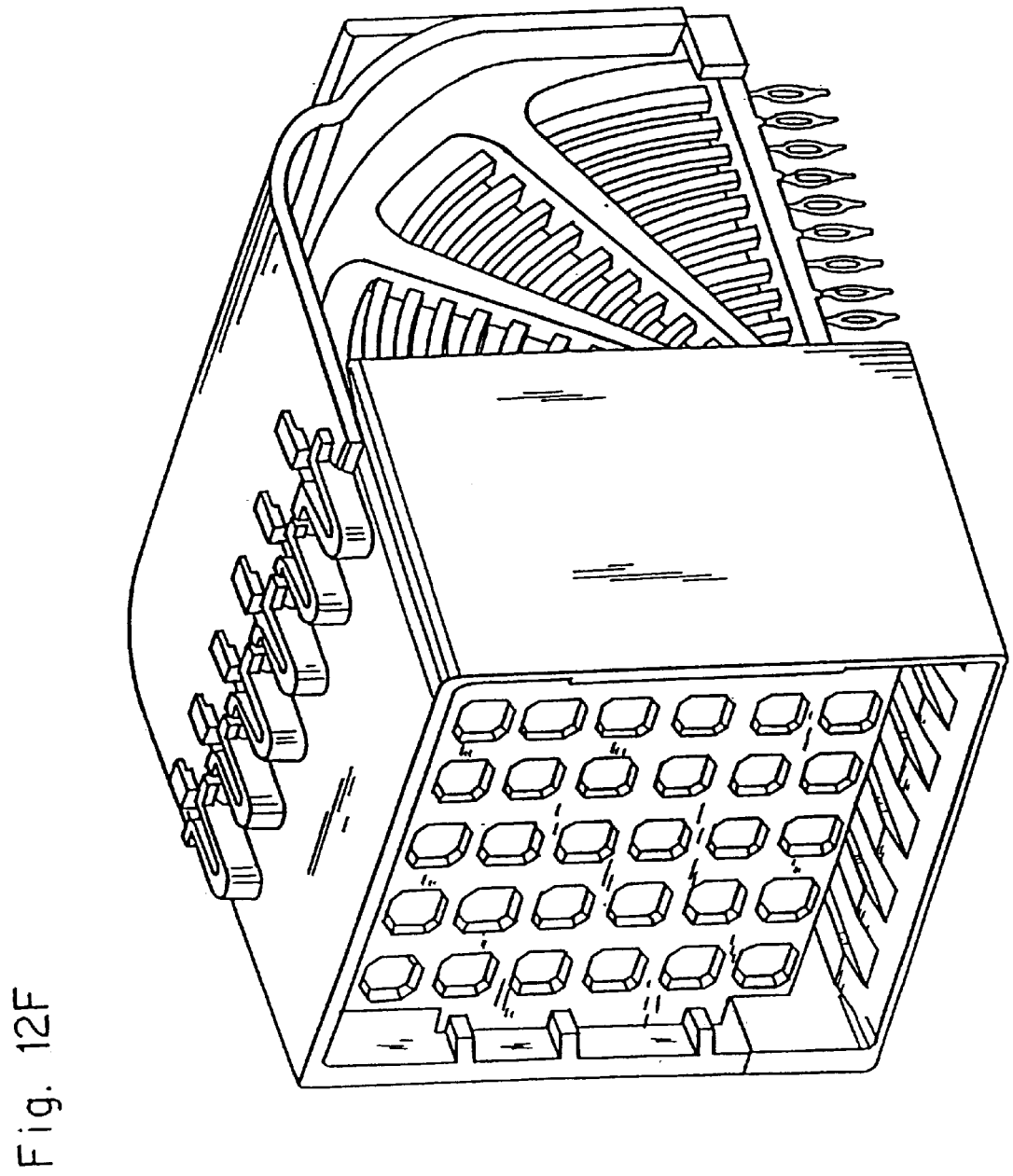
FIG. 12F is a perspective view of the daughter card connector with the cover plate.

In FIG. 12E, the cover plate 400 is depicted in an exploded condition and each of the signal contacts 78 is visible. In FIG. 12F, the cover plate 400 is depicted positioned within the hood enclosure 72. A distal end of the signal contacts 78 is positioned inwardly from the cover plate 400. Advantageously, the cover plate 400 protects what might otherwise be vulnerable spring-like signal contacts 78. The projecting pillars 50 and associated contacts 52 extend through the openings 410 to permit the contacts 52, 78, 62, 80 to make contact and engage.

Figure 12G:
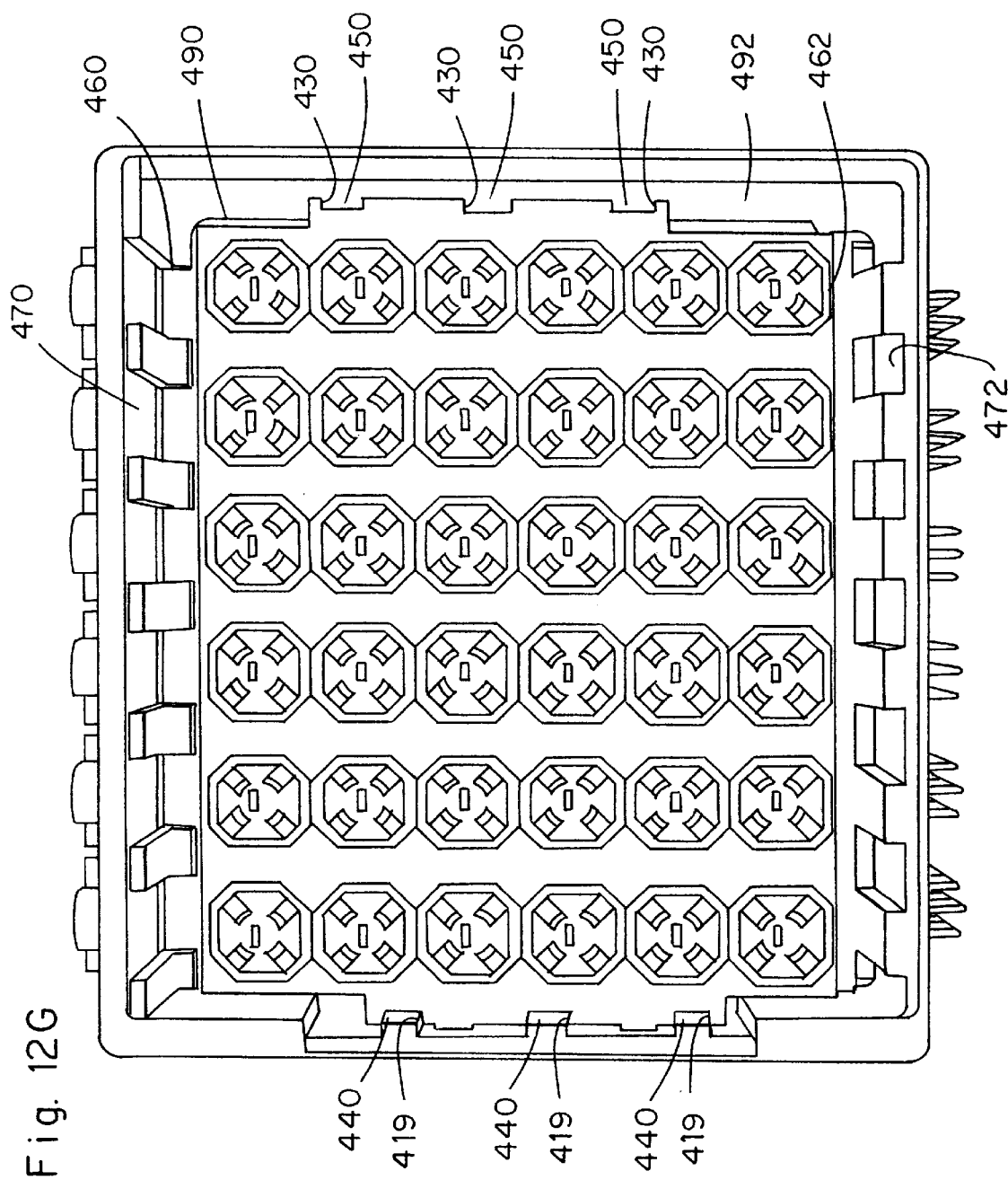
FIG. 12G is a side elevational view of the cover plate positioned within the hood enclosure.
Figure 12H:
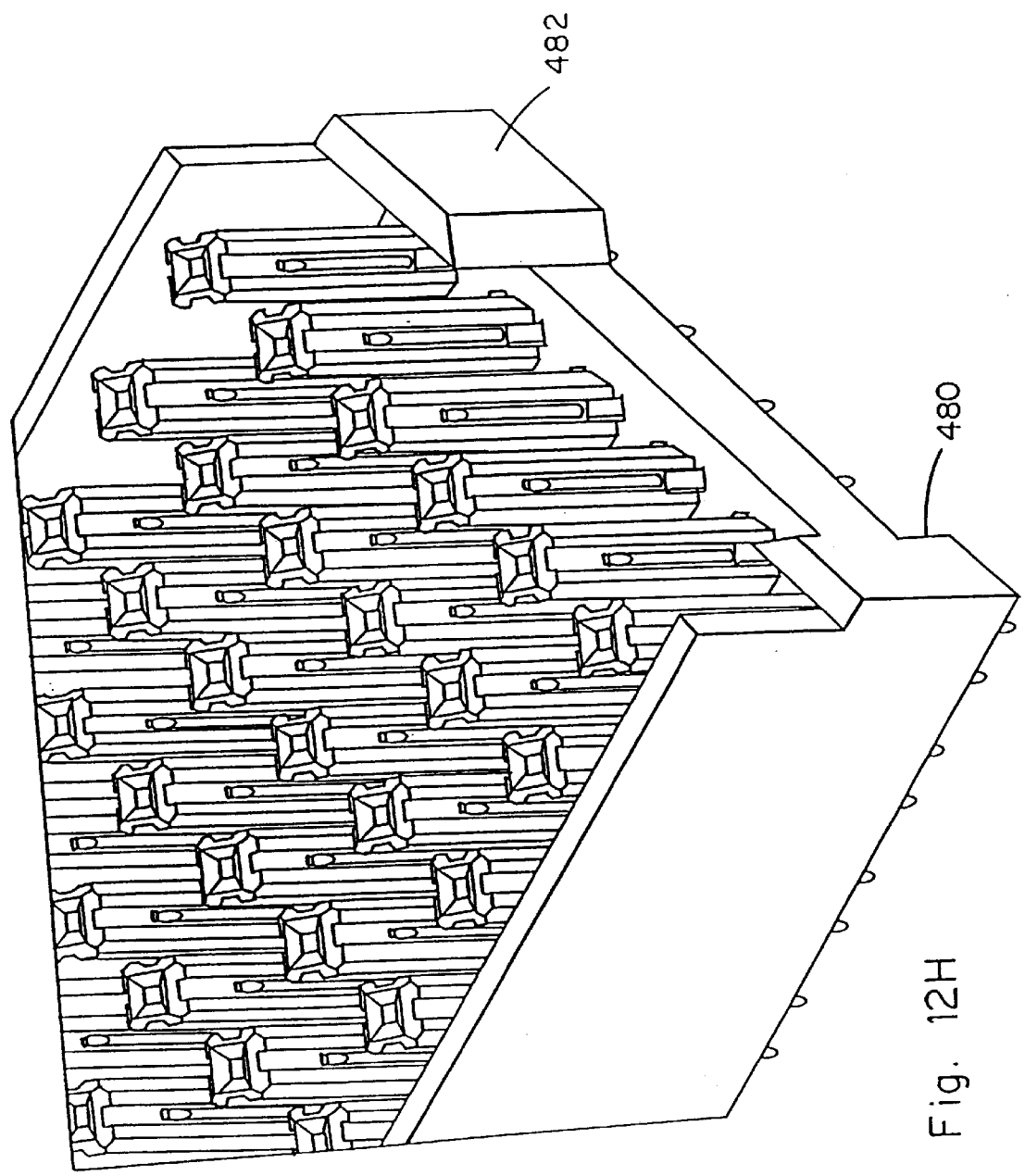
FIG. 12H is a perspective view of the backplane connector having keys used in polarizing the connector.

In FIG. 12G, the cover plate 400 is illustrated as being aligned with the hood enclosure 72 using a plurality of alignment tabs and slots including a plurality of left alignment slots 419 and right alignment slots 430 formed in the cover plate which can be aligned with corresponding keys 440, 450 extending inwardly from opposite sides of the hood enclosure 72. The cover plate 400 will be produced as a metal injection molded component or by any other manufacturing process such as stamped or metallic plated plastic suitable for use as an electrical shield. The cover plate 400 will then be coated with a nonconductive material to prevent the signal contacts 78 from electrically shorting to the cover plate 400. The cover plate can only be positioned in the hood enclosure in one orientation. Between upper 460 and lower edges 462 of the cover plate 400 and an upper, inner surface 470 and a lower inner surface 472 the hood enclosure 72 are formed two horizontal slots having a first width and a second width. The wider slot can receive the wider sidewall 46 and the narrow slot can receive the narrower sidewall 47. Additionally, as depicted in FIG. 12H, keys 480, 482 can be provided on the body 44 to align with vertical slots 490, 492.

Figure 12I:
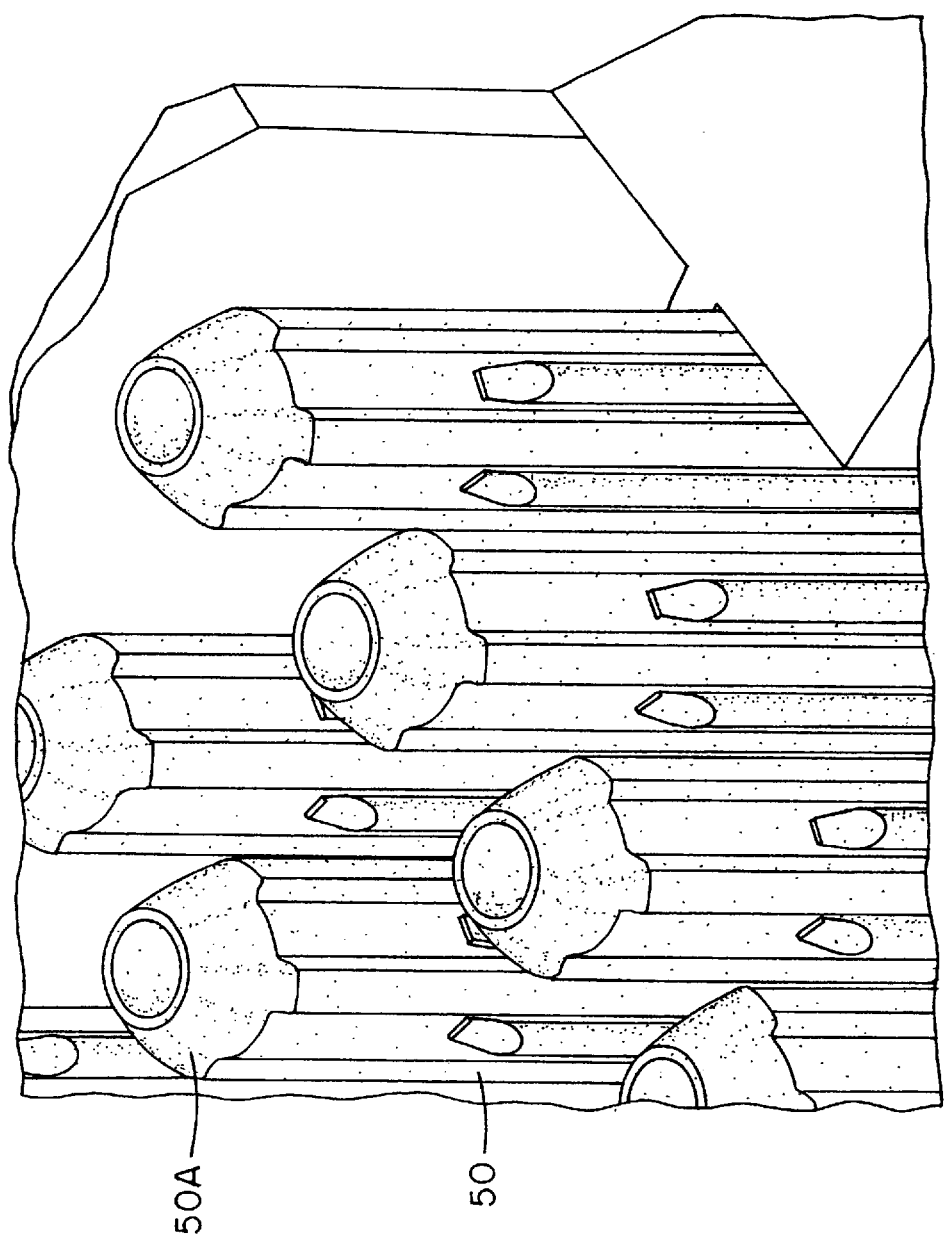
FIG. 12I is a perspective view of an alternative construction for the insulative pillar.

In FIG. 12I, an alternative pillar structure is depicted. The pillar structure is different in that there is a conical upper surface 50a a distal end of the pillar 50. It has been determined that this arrangement allows the flexible signal contact 78 to flex before making contact with the signal contacts 52 located adjacent to pillars 50.

Figure 12J:
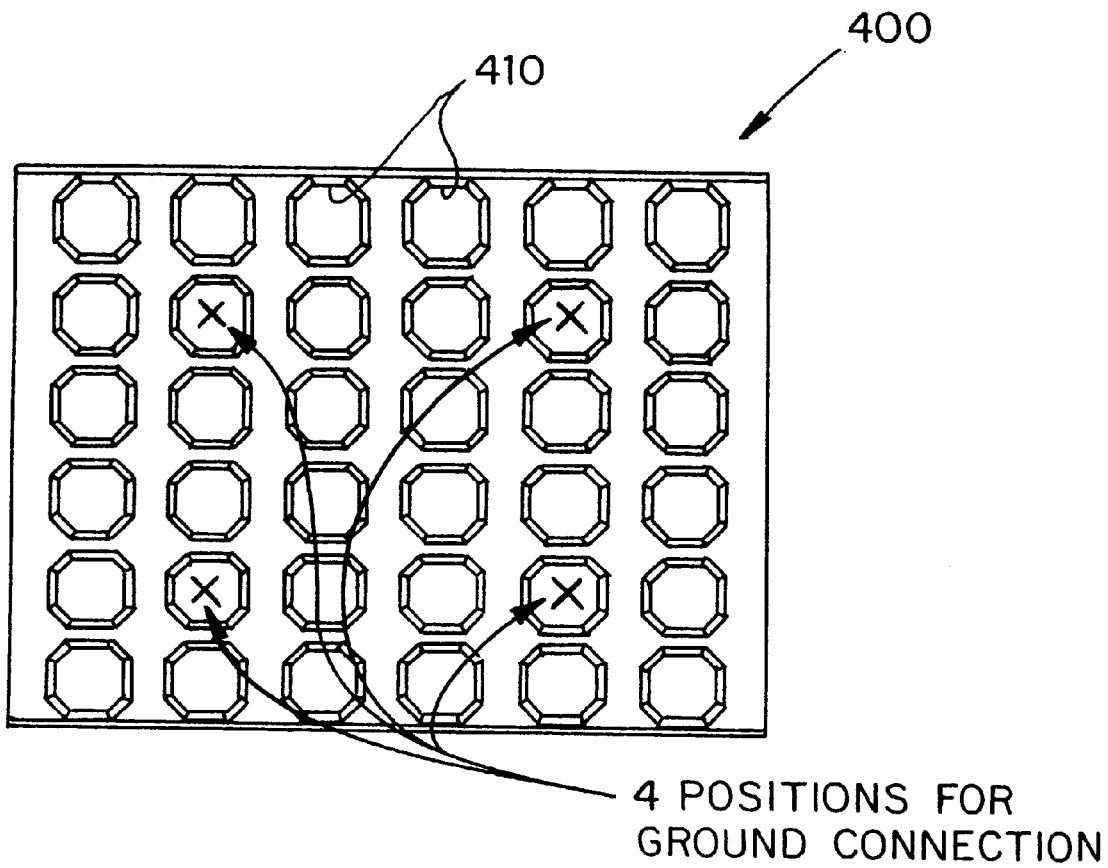
FIG. 12J is a top plan viewing schematically illustrating four positions for ground connection of the set of contacts.

In FIG. 12J, a number of sets of electrical contacts 72 will be utilized to connect the closed-entry cover plate 400 to ground. It is currently envisioned to use one contact from each of the contact sets 78 at the four positions indicated in FIG. 12J, although other contact positions and numbers of contact sets can also be used. Some of the electrical contacts 52 will be replaced with electrical contacts 52a having a different configuration. The electrical contacts 52a will not be used to carry signals but instead will be used as a conductive path to ground. The electrical contacts 52a will replace one of the four signal carrying contacts 52 and will flex outwardly to be in contact with protrusions 420 of the closed-entry cover plate 400. Each of the electrical contacts 52a used to provide a conductive path-to-ground is outwardly spring loaded to come into contact with the protrusions 420 of the electrically conductive closed entry cover plate 400 (see FIGS. 12B and 12D).

Figure 12K:
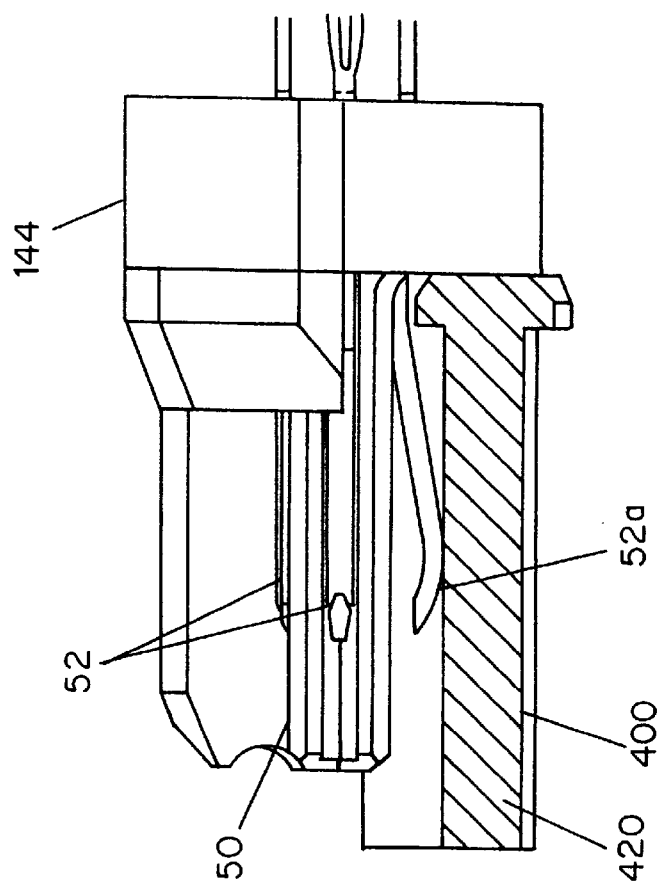
FIG. 12K is a side elevational view of one of the flexible contacts according to the present invention used to provide a conductive path to ground.
Figure 12L:
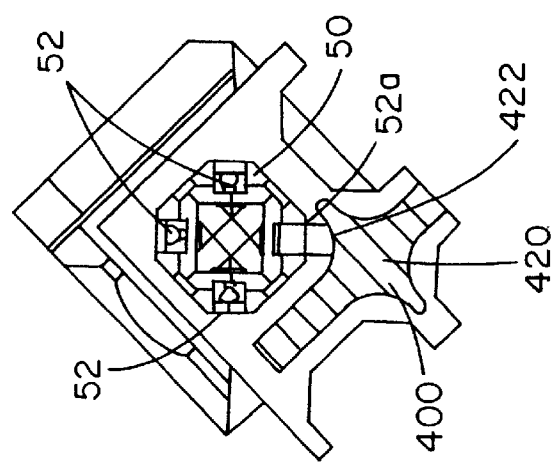
FIG. 12L is a top plan view of an alternative arrangement including insulative pillar having a flexible ground contact according to the present invention in contact with the closed entry plate.

As depicted in FIGS. 12K and 12L, the flexible grounding contact 52a replaces one of the signal contacts 52a replaces one of the signal contacts 52. The grounding contact 52a has a curved distal portion for ease of entry and for making and maintaining contact with a protrusion 420 of the closed entry plate 400. As depicted in FIG. 12L, the flexible grounding contact 52a is preferably in contact with a contact point 422 located in a curved corner section of the closed entry cover plate 400.

The closed entry cover plate 400 will be produced as a metal injection molded component, or by any other manufacturing process such as stamped and formed or plated plastic that will produce an item suitable for use as an electrical shield. The entire closed entry cover plate will be coated with non-conductive material to prevent the signal contacts 72 which carry electrical signals from shorting to the cover plate 400. Of course, in areas where the plate 400 is going to be in contact with contact set 72a, the cover plate 400 will not be coated with the non-conductive material in those areas. The protrusions shown in FIGS. 12B and 12D extend downwardly from the closed entry cover plate 400 and extend between the sets of contacts 72 for the majority of the length of the contacts 72. By making the closed entry cover plate 400 a conductive path to ground, the connector system cross-talk level is reduced.

Referring to FIGS. 2 and 12E, it should be noted that the height of the cover plate 400 is sufficient that the cover plate extends for the majority of the length of the signal contacts 78. By making the cover plate 400 a conductive path to ground, the connector system cross-talk level is reduced.

Referring to FIG. 12I, an alternative arrangement for the pillars 50 is depicted. Instead of the inwardly sloped pillars depicted, for example, in FIG. 2B, for ease of insertion with contact set 72, a pillar with a forward conical shape has been found to be easier to insert and spread the contact sets 72.

Figure 13:
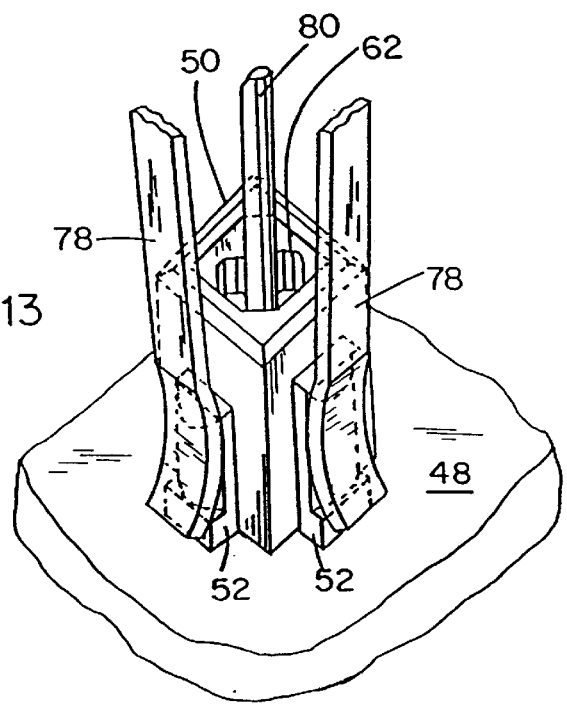
FIG. 13 is an enlarged view depicting a projecting portion being received by a receiving portion according to the present invention.

FIG. 13 illustrates a projection-type interconnect component 40 received within the conductive beams of a receiving-type interconnect component 35. When the projection-type interconnect component is received within the receiving-type interconnect component in this fashion, such interconnect components are said to be mated or plugged together. When the projection-type and receiving-type interconnect components are mated, the flexible beam portions 190 of the signal contacts 78 bend or spread apart to receive the projection-type interconnect component within the space between the contact portions of the conductive beams.

The mated position shown in FIG. 13 is achieved by moving the projection-type interconnect component 40 and the receiving-type interconnect component 30 toward one another. In the mated position, the contact portion of each conductive beam exerts a normal force against a contact portion of a corresponding one of the conductive posts.

The process of mating the backpanel connector 40 with a corresponding daughter card connector 35 will now be discussed with reference to FIG. 13. The backpanel connector 40 and the daughter card connector 35 are moved toward one another. Before the mating of the signal contacts 52, 78, the central ground post contact 80 spreads apart the legs 110, 112 of the central ground contact 62. This preferably occurs before any contact occurs between the signal contacts 52, 78. Eventually, the contact portions 250 of each flexible signal contact 78 contact the tapered upper sections 82 of the pillars 50 and then the rounded upper section of the signal contact 52. Upon further relative movement of the interconnect components toward one another, the curved configuration of the contact portion 250 causes the contact portions 250 of the flexible beams 190 to start to spread apart. Such spreading causes the flexible beams 190 to exert a normal force against the signal contacts 52 in the fully mated position, thereby ensuring reliable electrical contact between the signal contacts 52 and 78. Relative lateral movement of the signal contacts 52 and 78 is prevented by the rounded configuration of an intermediate portion of the signal contact and the corresponding configuration of the interface portion 256 and lead-in portions 258. With reference back to FIG. 2B, it may be preferable to have different sets of contacts mate before other sets of contacts. Thus, pillar 50 height can be adjusted. For two different pillar 50 heights central ground contacts 62, 62a can contact simultaneously with posts 80, 80a and then signal contacts 52, 52a and 78, 78a can be brought into contact. It should be understood that any sequencing can be attained to suit a particular application.

The insertion force required to mate the projection-type interconnect within the receiving-type interconnect component is highest at the point corresponding to the early phases of spreading of the flexible beams 190. The subsequent insertion force is less as it relates to frictional forces rather than spreading forces. The insertion-force required to mate the projection-type and receiving-type interconnect components can be reduced (and programmed mating, wherein one or more interconnections are completed before one or more other interconnections, may be provided) using a projection-type interconnect component having conductive posts which vary in height.

An alternative embodiment is depicted in FIG. 14 where the central ground contact 62 and the central ground contact post have been replaced with an optical fiber 500 and a fiber housing 502 and an optical fiber 510 and a fiber housing 512, respectively. Surrounding the fiber housing 502 is an electrically conductive case 520. The optical fiber 510 and the electrically conductive case terminate to the daughter card (not shown). Surrounding the fiber housing 512 is an electrically conductive case 530 and spring member 540. The optical fiber 500 and the electrically conductive case 530 terminate to the backpanel 42. The spring member 540 is annular and formed at the distal end of case 530 and is coextensive with case 520 to form an electrical contact to ground. The mating ends of the optical fibers 500, 510 are polished optically flat as depicted in FIG. 14 for transmission of an optical signal. In all other respects, the connector 30 is the same as previously described.

Although the contacts described herein are either signal or ground contacts, it should be appreciated that any of the contacts could be used to carry either signals or to serve as a ground path. Thus, any signal/ground pattern can be employed. For example, two of the four signal carrying contacts could be ground contacts instead. Similarly, some or all of the central ground contacts described herein could instead be used to carry signals.

It should now be apparent that an electrical interconnect system has been described in which multiple grounding methods are used to ensure that spurious signals and noise do not interfere with high speed transmissions. The principles of the present invention are particularly useful in high density electrical connection systems which are susceptible to noise and interference.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. An electrical interconnect system, comprising:
    a first electrical connector having a plurality of spaced apart sets of electrically conductive contacts, each said contact set having multiple signal contacts spaced outwardly from a central ground contact, each of said ground contacts having an end for contact with a ground plane in a first printed circuit board and a connector end, each of said signal contacts having a card end for contact with a signal path in the first printed board and a connector end, said first electrical connector having a plurality of flexible ground contacts for contact with a ground plane in the first printed circuit board;
    a second electrical connector having a plurality of spaced apart sets of electrically conductive contacts, each said contact set having multiple signal contacts spaced outwardly from a central ground contact, an insulator substantially surrounding said central ground contact and multiple signal contacts spaced outwardly from said insulator, each of said ground contacts having an end for contact with a ground plane in a second printed circuit board and a connector end, each of said signal contacts having an end for contact with a signal path in the second printed circuit board and a connector end;
    a closed entry plate positioned in said first electrical connector, said plate having a plurality of openings, wherein a set of contacts of said first electrical connector extends through a corresponding one of said plurality of openings, said flexible contacts are in contact with said closed entry plate,
    wherein when said first electrical connector is mated with said second electrical connector, said central ground contacts in said second electrical connector and said first electrical connector are in contact and said signal contacts in said first electrical connector and said second electrical connector are in contact.

2. The electrical interconnect system of claim 1, wherein said first electrical connector has at least one wafer including a left half and a right half each made of electrically insulating material, said wafer including one column of contacts.

3. The electrical interconnect system of claim 1, wherein each of said contact sets includes said central ground contact and four of said signal contacts.

4. The electrical interconnect system of claim 2, further comprising a stiffener for holding together said left half and said right half of said wafer.

5. The electrical interconnect system of claim 4, further comprising a ground contact connecting said stiffener to said ground plane.

6. The electrical interconnect system of claim 1, wherein said closed entry plate has a front plate having a plurality of openings and a plurality of protrusions extending from said front plate and substantially surrounding said openings.

7. The electrical interconnect system of claim 5, wherein said stiffener is formed of an electrically conductive material.

8. The electrical interconnect system of claim 6, wherein said closed entry plate is formed from an electrically conductive material and said closed entry plate has an electrically non-conductive coating applied to the majority of the exterior surface thereof.

9. The electrical interconnect system of claim 1, wherein said first electrical connector includes a body formed of electrically insulating material, said body including a base and a plurality of spaced apart elongate pillars extending from said base, each of said ground contacts at least partially located within one of said pillars.

10. The electrical interconnect system of claim 1, further comprising, for each set of contacts, an electrically insulating pillar positioned between said central ground contact and said multiple signal contacts.

11. The electrical interconnect system of claim 2, further comprising a hood enclosure connected to said wafers.

12. The electrical interconnect system of claim 10, wherein said pillar is hollow and has a rectangular cross-section and each of said signal contacts is positioned against a wall of said pillar.

13. The electrical interconnect system of claim 12, wherein said pillar extends beyond said signal contacts.

14. The electrical interconnect system of claim 1, wherein said multiple signal contacts of said first electrical connector are substantially freestanding and flexible.

15. The electrical interconnect system of claim 1, wherein said central ground contact of said second electrical connector includes a pair of flexible legs each extending from a central post.

16. The electrical interconnect system of claim 11, wherein, said closed entry plate positioned within said hood enclosure, said plate having a plurality of openings, wherein a set of contacts of said first electrical connector extends through a corresponding one of said plurality of openings, said flexible contacts in contact with said closed entry plate.

17. The electrical interconnect system of claim 12, wherein said pillar has a recess in each of said walls and each of said signal contacts is at least partially positioned in a corresponding one of said recesses.

18. The electrical interconnect system of claim 1, wherein said central ground contacts mate first and then said signal contacts mate.

19. The electrical interconnect system of claim 1, wherein said central ground contacts and said signal contacts are mated sequentially.

20. The electrical interconnect system of claim 17, wherein said signal contacts of said second electrical connector include a curved surface for mating with a corresponding curved surface of said signal contacts of said first electrical connector.

21. The electrical interconnect system of claim 4, further comprising an interconnect attached to said first connector and an electrically conductive surface on a body of said second connector, said interconnect providing a second ground path between said stiffener and said electrically conductive surface.

22. The electrical interconnect system of claim 16, wherein said first electrical connector and said second electrical connector are polarized.

* * * * *